(12) United States Patent
Kimura

(10) Patent No.: US 6,385,536 B2
(45) Date of Patent: May 7, 2002

(54) NAVIGATION APPARATUS, METHOD FOR MAP MATCHING PERFORMED IN THE NAVIGATION APPARATUS, AND COMPUTER-READABLE MEDIUM STORING A PROGRAM FOR EXECUTING THE METHOD

(75) Inventor: Keiichi Kimura, Aichi (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/829,431

(22) Filed: Apr. 10, 2001

(30) Foreign Application Priority Data

Apr. 11, 2000 (JP) ........................................ 2000-108874

(51) Int. Cl.[7] ............................................ G06F 165/00
(52) U.S. Cl. ...................... 701/209; 701/207; 701/210; 340/988
(58) Field of Search ................................ 701/201, 207, 701/208, 209, 210, 211; 340/988, 990, 995

(56) References Cited

U.S. PATENT DOCUMENTS

| | | | |
|---|---|---|---|
| 5,115,396 A | * 5/1992 | be Jong | 701/209 |
| 5,642,106 A | * 6/1997 | Hancock et al. | 340/988 |
| 5,757,289 A | * 5/1998 | Nimaro et al. | 340/995 |
| 6,018,697 A | 1/2000 | Morimoto et al. | 701/209 |

* cited by examiner

Primary Examiner—Richard M. Camby
(74) Attorney, Agent, or Firm—Lorusso & Loud

(57) ABSTRACT

A navigation apparatus has a camera for taking images of a road on which the vehicle is traveling; means for detecting and monitoring lane markers on the road by processing the images; and road determining means for determining the road on which the vehicle is traveling just after passing a fork. This road determination is made based on predetermined conditions relating to the fork and the lane markers detected and monitored. According to the structure described above, it is possible for the navigation apparatus to know the road on which the vehicle is traveling immediately after passing the fork. Further, when the vehicle's actual location is displayed at a wrong position on the digital road map, the navigation apparatus can correct the position immediately after passing the fork. This is advantageous in that the driver can know its accurate location from the displayed information immediately after passing the fork.

8 Claims, 23 Drawing Sheets

| | LANE MARKER DETECTION RESULTS | MEANING OF THE DETECTION RESULTS | |
|---|---|---|---|
| RESULT 1 | R-HAND LANE MARKER: SOLID LINE<br>--------------------<br>L-HAND LANE MARKER: SOLID LINE | The vehicle is on a single-lane road. | 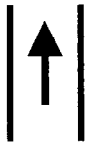 |
| RESULT 2 | R-HAND LANE MARKER: BROKEN LINE<br>--------------------<br>L-HAND LANE MARKER: BROKEN LINE | The vehicle is in a center lane (or one of center side lanes) of a road having three or more lanes. | 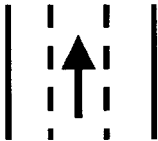 |
| RESULT 3 | R-HAND LANE MARKER: SOLID LINE<br>--------------------<br>L-HAND LANE MARKER: BROKEN LINE | The vehicle is in the rightmost lane of a road having two or more lanes. | 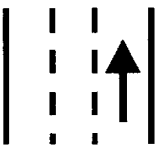 |
| RESULT 4 | R-HAND LANE MARKER: BROKEN LINE<br>--------------------<br>L-HAND LANE MARKER: SOLID LINE | The vehicle is in the leftmost lane of a road having two or more lanes. | 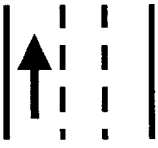 |
| RESULT 5 | Within Images from Camera, L-Hand Lane Marker Is Moving from L-Side to R-Side. | The vehicle is getting into an adjacent lane on the left side. |  |
| RESULT 6 | Within Images from Camera, R-Hand Lane Marker Is Moving from R-Side to L-Side. | The vehicle is getting into an adjacent lane on the right side. | 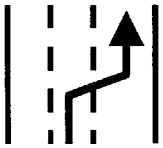 |

Fig. 11

NAVIGATION APPARATUS, METHOD FOR MAP MATCHING PERFORMED IN THE NAVIGATION APPARATUS, AND COMPUTER-READABLE MEDIUM STORING A PROGRAM FOR EXECUTING THE METHOD

BACKGROUND OF THE INVENTION

1. Field of the Invention

This invention relates to a navigation apparatus, a method for map matching performed in the navigation apparatus, and a computer-readable medium storing a program for executing the method.

2. Description of the Prior Art

Conventional navigation apparatuses are capable of computing recommended routes based on destination data established by a user (e.g., driver) and vehicle information such as vehicle speed, the current position of the vehicle and the like. Further, the conventional navigation apparatuses are capable of displaying the computed recommended routes on a screen to provide route guidance to the user..

Further, the conventional navigation apparatuses are also capable of carrying out a map matching process. In this map matching process, first the conventional navigation apparatus compares the "shape" of a vehicle's route that the vehicle has passed to the "actual road layout." Then, the navigation apparatus "matches" the vehicle's actual location on the road to its position on a digital road map on the screen.

Furthermore, the conventional navigation apparatuses are also capable of carrying out a corner control operation. In this corner control operation, the conventional navigation apparatus automatically shifts down into a low-speed transmission gear when the vehicle approaches a corner, so that the vehicle can turn the corner with low speed sufficient for passing the corner safely.

Hereinafter, problems involved in the conventional navigation apparatuses are described with reference to FIG. 4. In FIG. 4, a freeway 50 has a main way 51 and an off-ramp (branch way) 52 which branches off at a fork. As shown in this figure, within the distance "D" indicated by the arrow, the off-ramp 52 is "gradually" away from the main way 51 according as the off-ramp 52 extends.

When the vehicle having such a conventional navigation apparatus has entered the off-ramp 52 to drive off the freeway 50, it is impossible for the conventional navigation apparatus to know the exact location of the vehicle until the vehicle reaches a position where the off-ramp 52 is far enough away from the main way 51. In other words, it is impossible for the conventional navigation apparatus to properly judge whether the road on which the vehicle is actually traveling is the main way 51 or the off-ramp 52 until the vehicle reaches a position where the off-ramp 52 is far enough away from the main way 51. This is because the shape and position of the main way 51 within the distance D is very similar to those of the off-ramp 52 within the distance D, and therefore the conventional navigation apparatus cannot properly carry out the above-mentioned map matching process.

Therefore, when the vehicle having the conventional navigation apparatus enters the off-ramp 52 from the main way 51, there is a possibility that the following problems occur.

First, since the conventional navigation apparatus cannot exactly determine the road on which the vehicle is traveling just after passing the fork, there is a possibility that the vehicle's location is displayed at a wrong position on a digital road map on the screen for a while after passing the fork.

Second, even when the vehicle has inadvertently entered the off-ramp 52 from the main way 51, the conventional navigation apparatus cannot compute a new recommended route just after passing the fork. This is because the conventional navigation apparatus cannot properly know its current position until the vehicle is far enough away from the main way 51. Therefore, in such a case, the conventional navigation apparatus cannot provide information as to a new recommended route just after passing the fork.

On the other hand, when the vehicle having the conventional navigation apparatus travels straight on the main way 51 without entering the branch way 52, there is a possibility that the following problem occurs. Namely, when the vehicle travels straight on the main way 51, there is a possibility the conventional navigation apparatus misjudges that the vehicle has entered the branch way 52. This is because the shape and position of the main way 51 within the distance D is very similar to those of the branch way 52 within the distance D, and therefore the navigation apparatus cannot properly carry out the map matching process. Accordingly, in the case where the conventional navigation apparatus has made such a misjudgment, the navigation apparatus judges there is a corner 53 in front of the vehicle, although the vehicle is actually traveling on the main way 51. In such a case, the navigation apparatus carries out the corner control operation to reduce the speed of the vehicle, thus leading to the possibility of a car clash.

SUMMARY OF THE INVENTION

In view of the above, it is an object of the present invention to provide a navigation apparatus which makes it possible to properly carry out the map matching process to determine the road on which a vehicle is traveling just after passing a fork or on which the vehicle is traveling just after passing the fork.

Further, it is another object of the present invention to provide a method for the map matching performed in the navigation apparatus.

Furthermore, it is other object of the present invention to provide a computer-readable medium storing a program for executing the method for the map matching performed in the navigation apparatus.

In order to achieve the above objects, the present invention is directed to a navigation apparatus which is mounted on a vehicle, the navigation apparatus being capable of displaying a vehicle's location on a digital road map on a screen to provide route guidance to a user of the vehicle, the apparatus comprising:

current position detecting means for detecting a current position of the vehicle;

a database which stores route/map data including at least information of forks in roads, in which the fork information of each of the forks is stored in association with at least two predetermined conditions relating to features of the fork;

imaging means for taking images of a road on which the vehicle is traveling;

means for detecting and monitoring lane markers on the road to obtain detection results, the detection and monitoring being performed by processing the images taken by the imaging means;

first judging means for judging whether or not a fork is located ahead of the current position of the vehicle, the judgment being made based on the route/map data;

retrieval means for retrieving the fork information of the fork from the route/map data, the retrieval being made in a case where the first judging means judges that a fork is located ahead of the current position of the vehicle;

second judging means for judging whether or not the vehicle has entered a specific area that is set with respect to the fork; and road determining means for determining the road on which the vehicle is traveling after passing the fork or on which the vehicle is going to travel after passing the fork, the determination being made based on the detection results and the predetermined conditions relating to the fork.

According to the present invention described above, it is possible for the navigation apparatus to know the road on which the vehicle is traveling just after passing the specific fork (or, on which the vehicle is going to travel just after passing the specific fork), based on the road determination result. Further, when the vehicle's actual location is displayed at a wrong position on the digital road map, the navigation apparatus can correct the position so that the road on which the vehicle is actually traveling immediately after passing the fork just corresponds to the road image along which the vehicle's mark is moving on the digital road map. This is advantageous in the following points. Namely, the driver can know its accurate location from the displayed information on the screen immediately after passing the specific fork.

In this invention, it is preferable that the navigation apparatus further comprises third judging means for judging whether or not the vehicle has left the specific area, wherein the road determining means includes (i) first means for making the determination when the vehicle is within the specific area; and (ii) second means for making the determination in a case where the third judging means judges that the vehicle has left the specific area. In this case, it is preferable that the predetermined conditions include first and second conditions, in which the first means makes the determination based on the first condition and the detection results obtained when the vehicle is within the specific area, and the second means makes the determination based on the second condition and the detection results obtained when the vehicle is within the specific area. Further, it is also preferable that the navigation apparatus further comprises fourth judging means for judging whether or not the first means has successfully determined the road, wherein the second means makes the determination in a case where the fourth judging means judges that the first means has not successfully determined the road.

Further, in this invention, it is also preferable that the detection and monitoring means detects the type of each of the lane markers while monitoring lane change performed by the vehicle.

Furthermore, in this invention, it is also preferable that the navigation apparatus further comprises correcting means for correcting the vehicle's position displayed on the digital road map based on the determined road to match the vehicle's location on the road to its position on the digital road map.

Another aspect of the present invention is directed a method for map matching performed in a navigation apparatus mounted on a vehicle, the navigation apparatus being capable of displaying a vehicle's location on a digital road map on a screen and matching the vehicle's location on a road to its position on the digital road map, the method comprising the steps of:

(a) detecting a current position of the vehicle;

(b) taking images of a road on which the vehicle is traveling;

(c) detecting and watching lane markers on the road to obtain detection results, the detecting and watching being performed by processing the images taken at the step (b);

(d) judging whether or not a fork is located ahead of the current position of the vehicle based on route/map data stored in a database of the navigation apparatus, the route/map data including at least information of forks in roads, in which the fork information of each of the forks is stored in association with at least two predetermined conditions relating to features of the fork;

(e) retrieving the fork information of the fork from the route/map data in the database, the retrieval being made in a case where it is judged at the step (d) that a fork is located ahead of the current position of the vehicle;

(f) judging whether or not the vehicle has entered a specific area that is set with respect to the fork;

(g) determining the road on which the vehicle is traveling after passing the fork or on which the vehicle is going to travel after passing the fork, the determination being made based on the detection results and the predetermined conditions relating to the fork; and (h) correcting the vehicle's position displayed on the digital road map based on the determined road to match the vehicle's location on the road to its position on the digital road map.

Further, another aspect of the present invention is directed a computer-readable medium which stores a program for executing a method for map matching performed in a navigation apparatus mounted on a vehicle, the navigation apparatus being capable of displaying a vehicle's location on a digital road map on a screen and matching the vehicle's location on a road to its position on the digital road map, the method comprising the steps of:

(a) detecting a current position of the vehicle;

(b) taking images of a road on which the vehicle is traveling;

(c) detecting and watching lane markers on the road to obtain detection results, the detecting and watching being performed by processing the images taken at the step (b);

(d) judging whether or not a fork is located ahead of the current position of the vehicle based on route/map data stored in a database of the navigation apparatus, the route/map data including at least information of forks in roads, in which the fork information of each of the forks is stored in association with at least two predetermined conditions relating to features of the fork;

(e) retrieving the fork information of the fork from the route/map data in the database, the retrieval being made in a case where it is judged at the step (d) that a fork is located ahead of the current position of the vehicle;

(f) judging whether or not the vehicle has entered a specific area that is set with respect to the fork;

(g) determining the road on which the vehicle is traveling after passing the fork or on which the vehicle is going to travel after passing the fork, the determination being made based on the detection results and the predetermined conditions relating to the fork; and (h) correcting the vehicle's position displayed on the digital road map based on the determined road to match the vehicle's location on the road to its position on the digital road map.

These and other objects, structures and advantages of the present invention will be apparent more clearly from the following description of the invention based on the examples.

BRIEF DESCRIPTION OF THE DRAWINGS

FIG. 11 shows detection results which can be obtained by processing images from a camera of the navigation apparatus, and meaning of each detection result;

DETAILED DESCRIPTION OF THE PREFERRED EMBODIMENTS

Hereinafter, a navigation apparatus, a method for map matching performed in the navigation apparatus, and a computer-readable medium storing a program for executing the method according to the present invention will be described with reference to the appended drawings.

Figure 1:
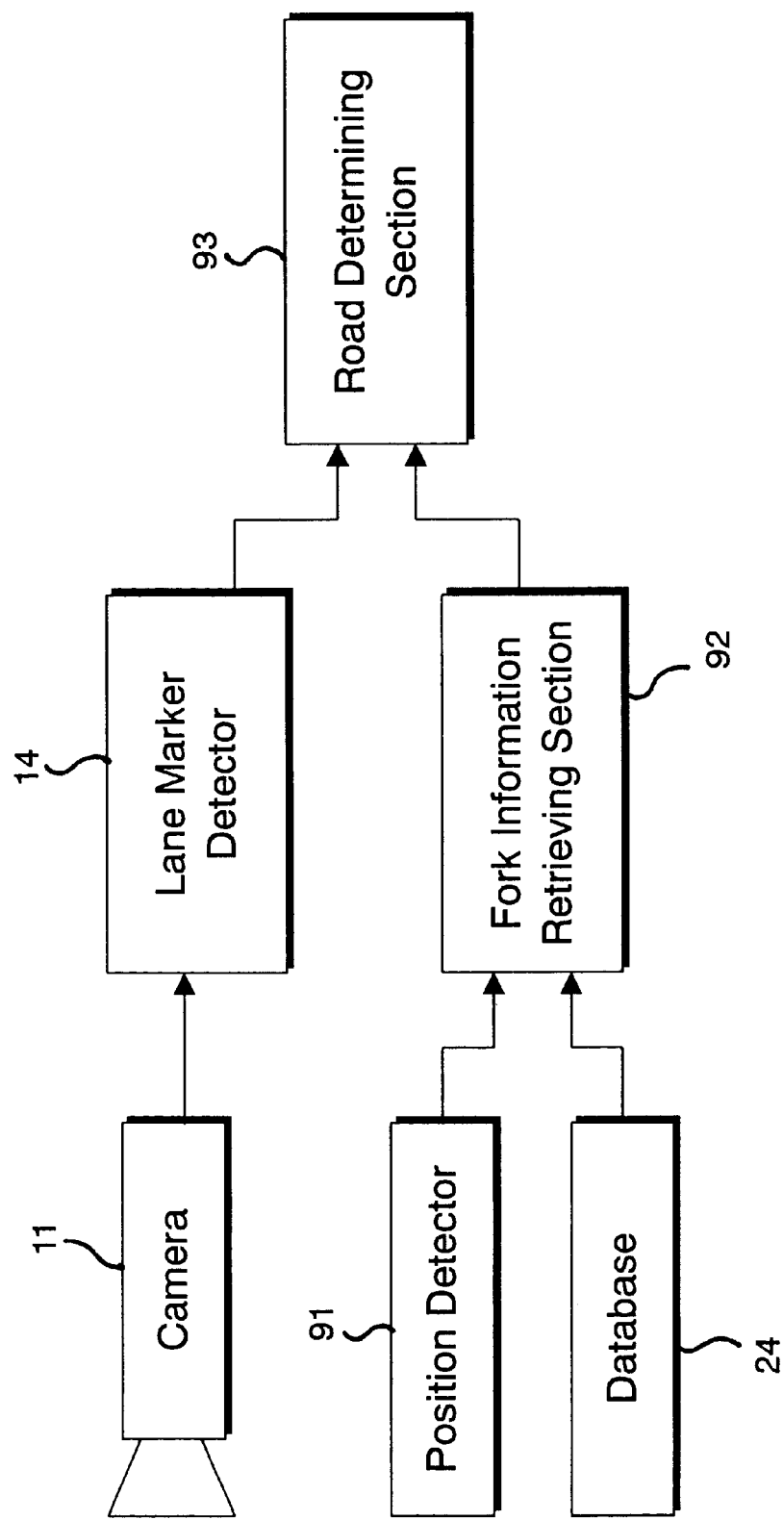
FIG. 1 is a block diagram which shows structure of a navigation apparatus according to the present invention.
Figure 2:
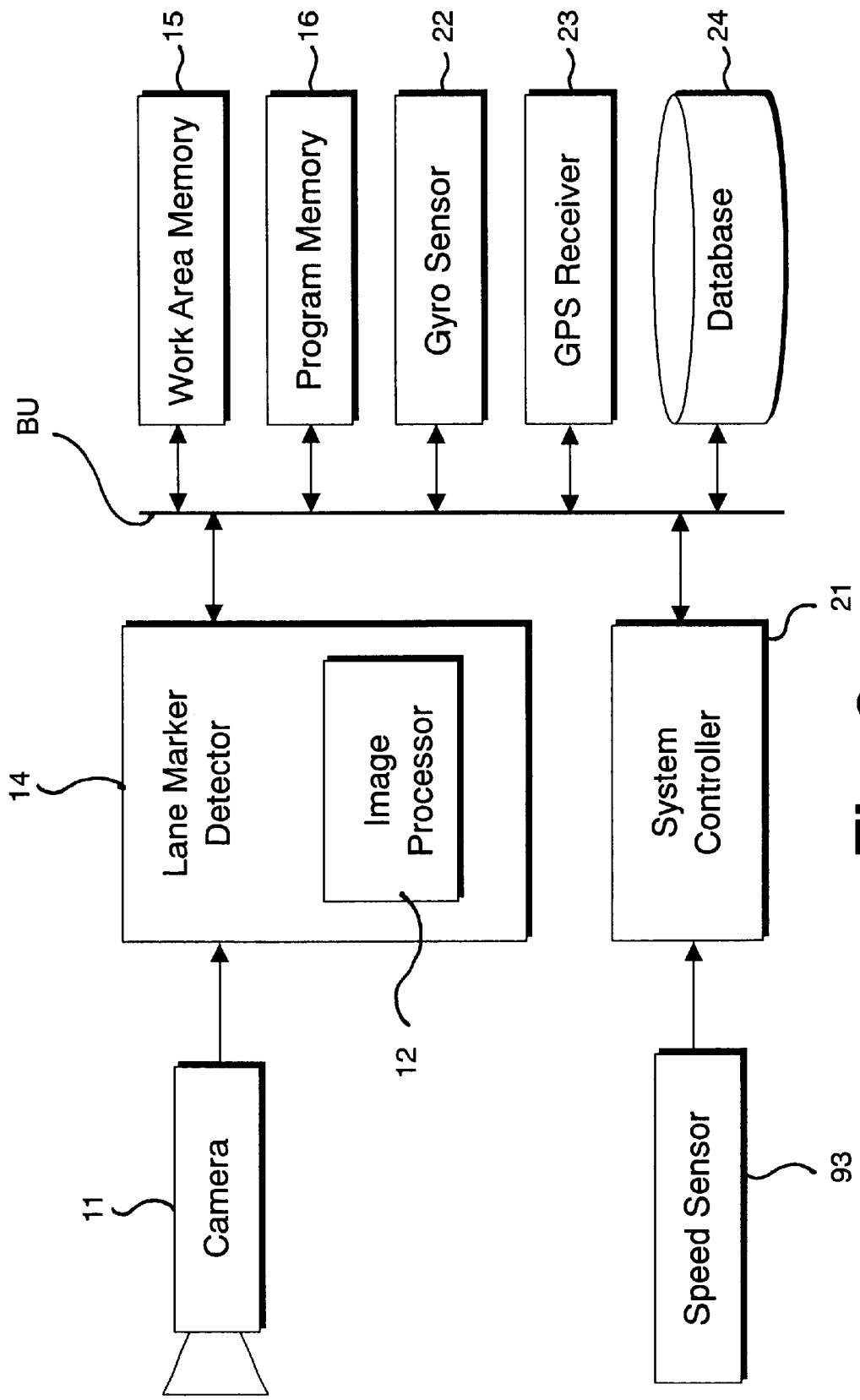
FIG. 2 is another block diagram which shows the structure of the navigation apparatus according to the present invention.
Figure 3:
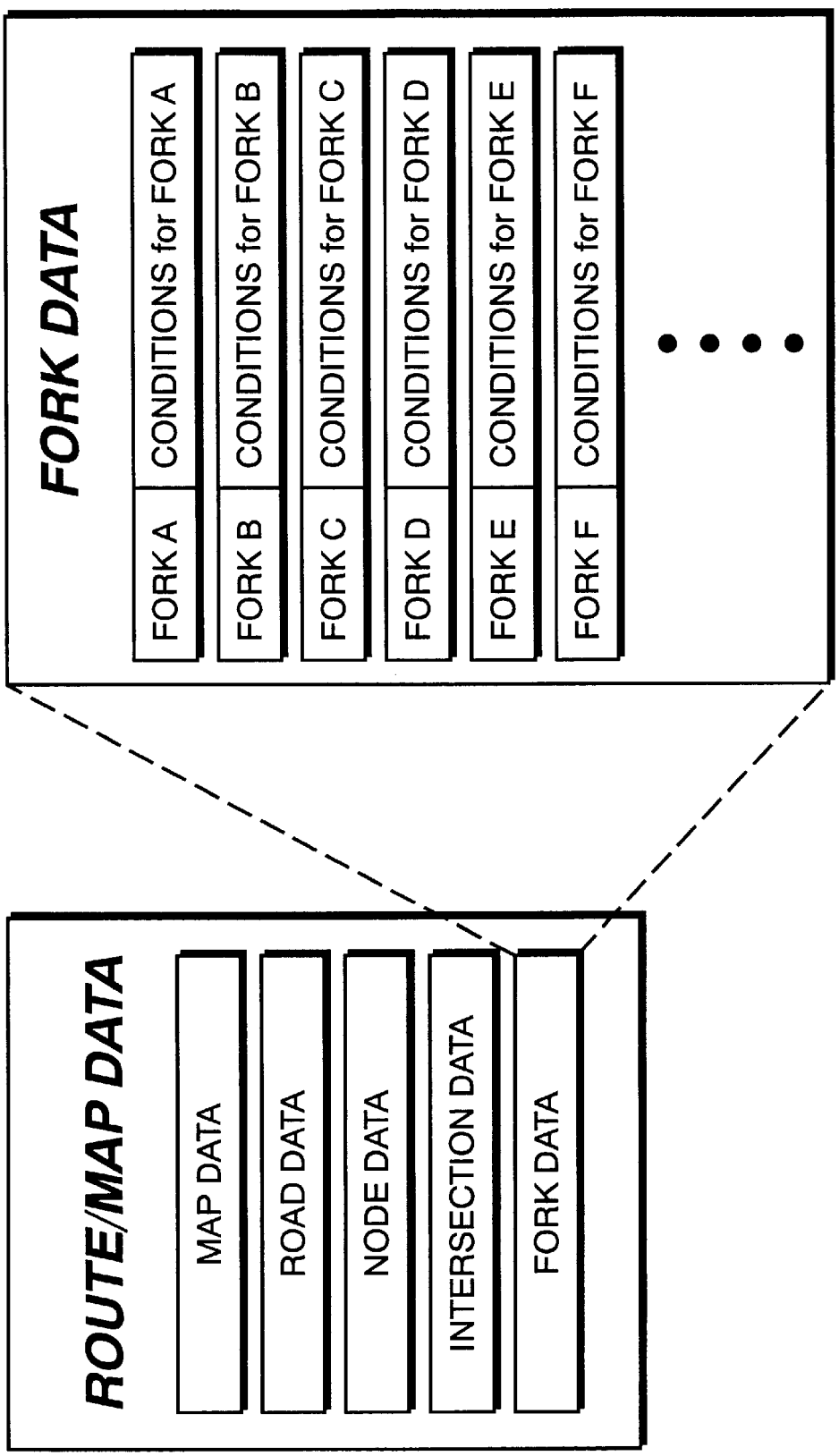
FIG. 3 shows data structure of route/map data stored in a database of the navigation system, and data structure of fork data included in the route/map data.

First, the general structure of the navigation apparatus of this invention is described with reference to FIGS. 1–3. FIG. 1 is a block diagram which shows structure of the navigation apparatus. FIG. 2 is another block diagram which shows the structure of the navigation apparatus. FIG. 3 shows data structure of data stored in the navigation system.

The navigation apparatus of this invention is designed to be mounted on a vehicle, and it is capable of displaying a vehicle's location on a digital road map on a screen to provide route guidance to a user (driver) of the vehicle.

As shown in FIG. 1, the navigation apparatus includes a position detector (current position detecting means) 91 for detecting a current position of the vehicle; a database 24 which stores route/map data; a camera 11 (which includes imaging means such as a CCD) for taking images of a road on which the vehicle is traveling; a lane marker detector 14 for detecting and monitoring lane markers on the road to obtain a detection result(s), which is carried out by processing the images taken by the camera 11. The camera 11 is mounted at a predetermined location of the vehicle, for example, inside the vehicle compartment near the rearview mirror on the upper portion of the windshield.

Further, the navigation apparatus also includes first judging means for judging whether or not a fork is located ahead of the current position of the vehicle; fork information retrieving section (retrieval means) 92 for retrieving fork information of the fork from the route/map data; second judging means for judging whether or not the vehicle has entered a specific area that is set with respect to the fork; and road determining section (road determining means) 93 for determining the road on which the vehicle is traveling after passing the fork or on which the vehicle is going to travel after passing the fork. These elements will be described later in more detail with reference to Steps shown in FIG. 7.

In addition, as shown in FIG. 2, the navigation apparatus also includes an image processor 12 for processing the image taken by the camera 11, which is included in the lane marker detector 14; a work area memory 15 which is capable of storing edge image data (described later with reference to FIGS. 14 and 15) generated by the lane marker detector 14; a program memory 16 which stores various programs such as a recommended-route determination program, a route guidance program, a system control program and the like; a gyro sensor 22 and a GPS (Global Positioning System) receiver 23 which are included in the position detector 91 shown in FIG. 1; a system controller 21 for controlling operations performed in the navigation apparatus; a bus BU via which the above-mentioned elements are electrically connected to each other; and a speed sensor 33 connected to the system controller 21. Further, although it is not shown in the drawings, the navigation apparatus also includes an input devise for inputting various information such as destination data; and a display for displaying various information on a screen.

The lane marker detector 14 having the image processor 12 functions as "lane marker detection and monitoring means" of the navigation apparatus of this invention. When the vehicle is traveling within a specific area, this lane marker detector 14 detects and monitors each of right and left lane markers defining a lane in which the vehicle is traveling, and determines the type (i.e., solid or broken line) of each of the lane markers. In this road-type determination process, in the case where the type of the lane maker is judged to be a solid line, the lane marker detector 14 sets a solid-line judgment flag in an ON state. On the other hand, in the case where it is judged to be a broken line, the lane marker detector 14 sets a broken-line judgment flag in an ON state. Further, in the lane marker monitoring process, the lane marker detector 14 monitors movement of the lane markers within continuous digital images form the camera 11 to make a judgment as to whether the vehicle is changing lanes toward the right side or the left side. In this monitoring process, in the case where the vehicle is judged to be changing lanes toward the right side, the lane marker detector 14 sets a rightward lane-change judgment flag in an ON state. On the other hand, in the case where the vehicle is judged to be changing lanes toward the left side, the lane marker detector 14 sets a leftward lane-change judgment flag in an ON state. Flag data (which indicates an ON or OFF state) of each of the above-mentioned flags is send to the system controller 21 as a detection result.

The work area memory 15 and program memory 16 are constructed from a data storing medium such as a magnetic tape, magnetic disk, floppy disk, magnetic drum, CD, MD, DVD, optical disc, IC card, optical card or the like. As described above, the work area memory 15 is capable of storing edge image data generated by the lane marker detector 14. In the program memory 16, various programs are stored. In this connection, the above-mentioned edge image data and programs may be stored in an external data storage medium (e.g., flush memory) which can be externally connected to the navigation apparatus via the bus BU. By connecting such an external storage medium which stores, for example, programs, it is possible to upgrade the programs stored in the program memory 16.

The camera 11 is mounted inside the vehicle compartment near the rearview mirror on the upper portion of the windshield. However, in this invention, the number of cameras to be mounted as well as a position where the camera 11 is mounted is not limited. For example, the camera 11 may be mounted at a predetermined location on the outside of the vehicle. Further, the camera 11 may also be mounted at a prescribed location on the rear of the vehicle as well as inside the vehicle compartment near the rearview mirror on the upper portion of the windshield.

Each of the gyro sensor 22 and the GPS receiver 23 is functions as current position detecting means for detecting the current position of the vehicle. The gyro sensor 22 includes a sensor that uses a gas rate gyro, vibrating structure gyro or the like for computing angular velocity. By integrating the angular velocity computed by the gyro sensor 22, it is possible for the navigation apparatus to know the direction of vehicle's motion. The GPS receiver 23 receives signals (positional data) from the GPS satellites orbiting the Earth to determine its latitude and longitude. In addition to the gyro sensor 22 and the GPS receiver 23, the navigation apparatus may include other sensors for detecting the current position of the vehicle, such as a geomagnetic sensor, distance sensor, steering sensor, beacon sensor, altimeter and/or the like.

The display includes a display device such as a CRT display, liquid crystal display, plasma display and the like. In this invention, the display may also include a hologram device for projecting a hologram on the windshield of the vehicle. On the screen of the display, various information such as a digital road map, route guidance, recommended route information, operation menu, operating manual and the like are displayed. Further, when a navigation operation is being carried out, the vehicle's current location on the road is displayed on the digital road map on the screen as a vehicle's mark.

The input device includes information input means such as a keyboard, mouse, bar code reader, light pen, remote control device for remote operations and the like. In this invention, the input device may also include a touch screen that functions as a pointing device. For example, this input device is used for inputting information such as a destination, and for manually matching the vehicle's location on the road to its position on the digital road map on the screen when starting travel.

The database 24 stores the route/map data. As shown in FIG. 3, this rote/map data includes various data such as map data, road data, node data, intersection data, fork data (which includes fork information used in this invention) and the like. In addition to the above-mentioned data, the database 24 of the navigation apparatus may store, for example, data for displaying photographic images of buildings, intersections, forks and the like; data for providing information for hotels, gas stations, amusement parks and the like; and voice data which is used to output voice information via a speaker provided in the vehicle. Further, the database 24 may also store data required for computing recommended routes to a destination; data for displaying the determined recommended route; data for displaying the distance to a next intersection; data for displaying the traveling direction; and the like.

The fork data in the route/map data in the database 24 includes information of forks in roads. In this connection, it is to be noted that in this invention, as shown in FIG. 3 the fork information of each of the forks is stored in association with two or more predetermined conditions related to features of the fork. (Description for such conditions will be given later.)

The intersection data includes information indicating the type of intersection, the intersection number, the presence or absence of traffic signals, and the like.

The node data includes various data such as coordinates indicating the position of each of nodes forming a road image on the digital roadmap; the length of a link that connects adjacent nodes; the link angle formed by two links which join together at a node; a fork flag for indicating whether or not a node represents a fork; and the like. In this connection, it is to be noted that the node is one of elements that indicate at least the position and shape of a road on the digital road map displayed on the screen.

The road data includes information related to roads, such as width, grade, cant, bank, road surface conditions, number of lanes of each road, places where the number of lanes decrease, places where the width narrows, and the like. Further, the road data also includes information related to corners, such as the radius of curvature, intersections, T-shaped roads, entrance way to a corner, and the like. In addition, the road data also includes information related to road features, such as railway crossings, off-ramps branching off from freeways, on-ramps branching off from freeways, toll gates of toll roads, downgrades, upgrades, road classification (national highway, freeway, etc.), and the like.

To the Bus BU of the navigation apparatus, there may be connected, for example, an engine control apparatus for controlling an engine speed, and an automatic transmission control apparatus for controlling an automatic transmission system provided in the vehicle. Further, there may also be connected various other devices, such as an accelerator sensor for detecting the amount of depression of an accelerator pedal; a cruise control sensor for detecting the establishment of cruise control; a brake sensor for detecting the depression of a brake pedal; and the like.

When the engine control apparatus and the automatic transmission control apparatus are connected to the navigation apparatus, it is possible to carry out a corner control operation. In this corner control operation, the navigation apparatus automatically shifts down into a low-speed transmission gear when the vehicle approaches a corner, so that the vehicle can turn the corner with low speed sufficient for passing the corner safely. Further, in another corner control, the navigation apparatus controls the vehicle so that oil pressure is supplied to an oil hydraulic cylinder for a foot brake, when the vehicle approaches a corner. This makes it possible to automatically slow the speed of the vehicle before the vehicle enters the corner.

Next, operations of the navigation apparatus will be described.

First, the system controller 21 of the navigation apparatus carries out a navigation initialization process to initialize various programs. Next, the system controller 21 carries out a destination establishing process to establish a destination, when the driver inputs the destination with the input device. Then, the navigation apparatus carries out a recommended route determination process to determine a recommended route from the current position to the destination. In this regard, the driver may input transit points through which the vehicle should travel to the destination, as well as the destination. Further, the driver may also input route-determination conditions such as a condition of taking account of shorter distance, a condition of taking account of shorter traveling time, and the like.

Next, the navigation apparatus carries out a road determination process. As will be described later in detail, in this road determination process, the navigation apparatus determines a road on which the vehicle is traveling after passing a specific fork or on which the vehicle is going to travel after passing the specific fork. This road determination process is carried out based on (i) lane markers detected and monitored by the lane marker detector 14 and (ii) predetermined conditions (see fork data in FIG. 3) related to the specific fork.

Next, based on a determination result obtained through the road determination process described above, the navigation apparatus judges whether or not the vehicle's actual location on the road is exactly displayed on the digital road map on the screen, that is, whether or not the vehicle's actual location just corresponds to its position on the digital road map. In the case where it is judged that the actual location does not correspond to its position on the digital roadmap, the navigation apparatus executes a map matching process. In this map matching process, first the navigation apparatus compares the "shape" of a vehicle's route that the vehicle has passed to the "actual road layout." Then, the navigation apparatus "matches" the vehicle's actual location on the road to its position on the digital roadmap. In this way, the vehicle's location is exactly displayed on the digital road map so that the road on which the vehicle is actually traveling immediately after passing the specific fork just corresponds to the road image along which the vehicle's mark is moving on the digital road map. However, in the case where it is judged that the actual location corresponds to its position on the digital road map, the navigation apparatus does not execute the map matching process as described above.

Hereinafter, advantages achieved by the above-mentioned map matching process will be described.

The navigation apparatus according to the present invention is designed to carry out the map matching process through the following steps (a)–(h).

(a) Step of detecting a current position of the vehicle.
(b) Step of taking images of a road on which the vehicle is traveling.
(c) Step of detecting and watching lane markers on the road to obtain a detection result(s). The detection and watch are carried out by processing the images taken at the step (b).
(d) Step of judging whether or not a specific fork is located ahead of the current position of the vehicle based on the route/map data stored in the database 24.
(e) Step of retrieving the fork information of the specific fork from the route/map data. The retrieval is carried out in the case where it is judged at the step (d) that a specific fork is located ahead of the current position of the vehicle.
(f) Step of judging whether or not the vehicle has entered a specific area that is set with respect to the specific fork.
(g) Step of determining the road on which the vehicle is traveling after passing the specific fork or on which the vehicle is going to travel after passing the specific fork. This determination is carried out based on (i) the obtained detection result(s) and (ii) the predetermined conditions related to the specific fork. (In the following description, a road on which the vehicle is traveling after passing a specific fork and on which the vehicle is going to travel after passing the specific fork is referred to as a "traveling road")
(h) Step of correcting the vehicle's position displayed on the digital road map based on the determined road, if needed.

By determining the traveling road in this manner, it is possible for the navigation apparatus to know the traveling road just after passing the specific fork, based on the determination result at Step (g). Further, when the vehicle's actual location is displayed at a wrong position on the digital road map, the navigation apparatus can correct the position so that the road on which the vehicle is actually traveling immediately after passing the fork DS just corresponds to the road image along which the vehicle's mark is moving on the digital road map. This is advantageous in the following points. Namely, the driver can know its accurate location from the displayed information on the screen just after passing the specific fork. In addition, it is possible to prevent the corner control operation described above from being carried out at an inappropriate location.

Further, in the road determination process in the above-mentioned Step (g), the navigation apparatus does not depend on lane markers outside the specific area to determine the traveling road. This prevents the lane marker detection accuracy from being lowered due to shadows from other vehicles and the like.

In this invention, the determination in Step (g) is carried out in two stages. Specifically, in a first determination process (first stage), the navigation apparatus tries to determine the traveling road based on (i) a predetermined condition(s) related to the specific fork and (ii) a detection result(s) (i.e., any one or more of Results 1–6 shown in FIG. 7) obtained when the vehicle is within the specific area. This first determination process is carried out when the vehicle is within the specific area. Further, in the case where the navigation apparatus has not successfully determined the traveling road in the first determination process described above, after the vehicle has left the specific area AR1 the navigation apparatus executes a second determination process (second stage) to determine the traveling road. In this second determination process, the navigation apparatus tries to determine the traveling road based on (i) another predetermined condition(s) related to the specific fork and (ii) the detection result(s) obtained when the vehicle was within the specific area.

Figure 4:
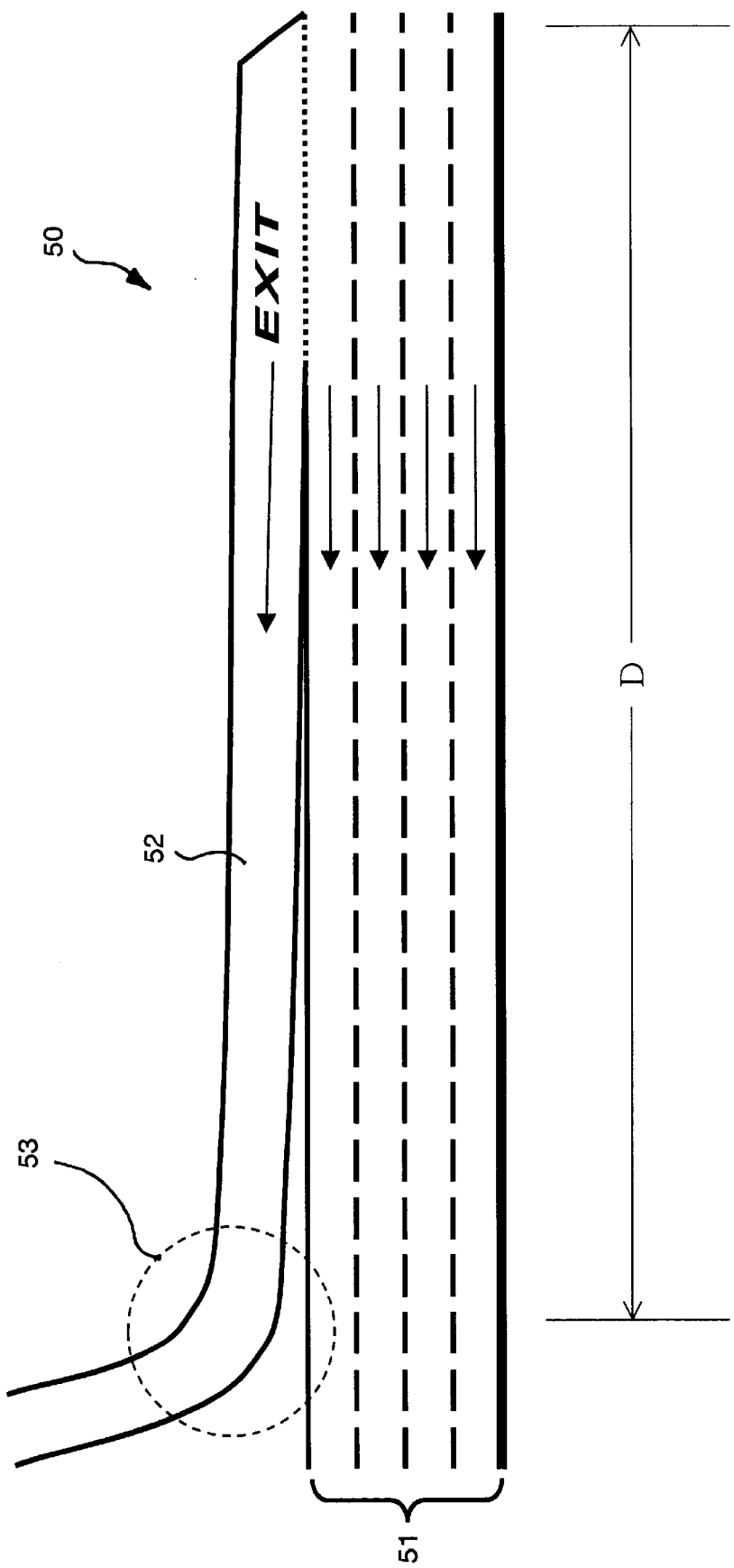
FIG. 4 shows an example of a road having a fork which has a main way and a branch way (off-ramp) branching off from the main way at the fork.

According to the above-mentioned road determination process which includes the first and second determination processes, it is possible for the navigation apparatus to determine the traveling properly, even when the vehicle passes a fork in a road as shown in FIG. 4.

Further, in the case where the traveling road has been successfully determined through the first determination process (first stage), it is possible for the navigation apparatus to know the traveling road just after passing a specific fork but before exiting the specific area. Therefore, if needed, the navigation apparatus can perform the map matching process properly just after passing the specific fork. This is advantageous in that the accurate positional information is provided to the driver via the display immediately after passing the specific fork.

Figure 5:
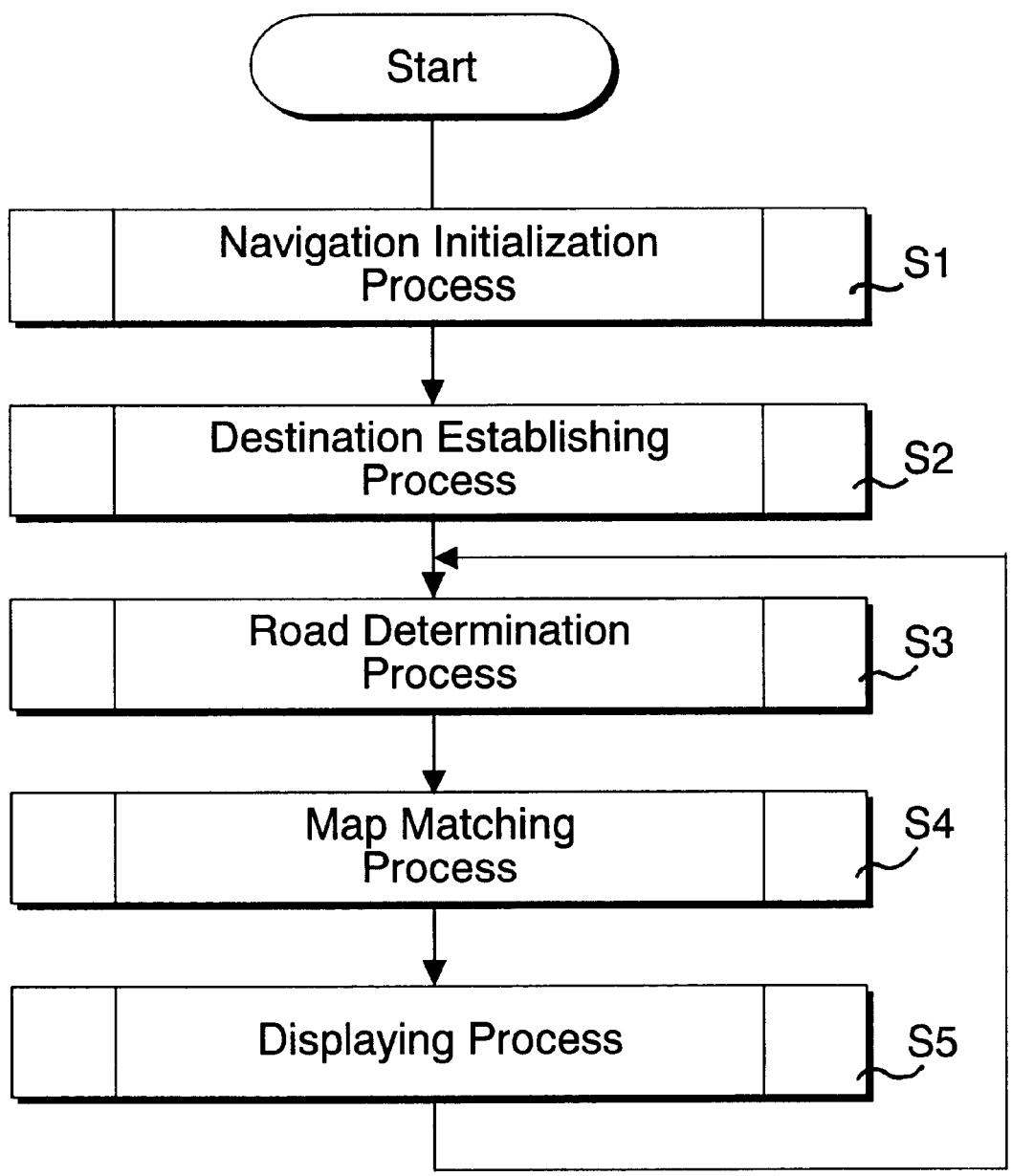
FIG. 5 is a flowchart which shows a main routine executed by the navigation apparatus.

Next, the flow chart shown in FIG. 5 will be described. FIG. 5 is a flowchart which shows a main routine executed by the navigation apparatus.

Step S1: The navigation initialization process is carried out.
Step S2: The destination establishing process is carried out.
Step S3: The road determination process is carried out.
Step S4: The map matching process is carried out.
Step S5: The vehicle's current position is displayed on the digital road map, and then the subroutine returns to Step S3.

Figure 6:
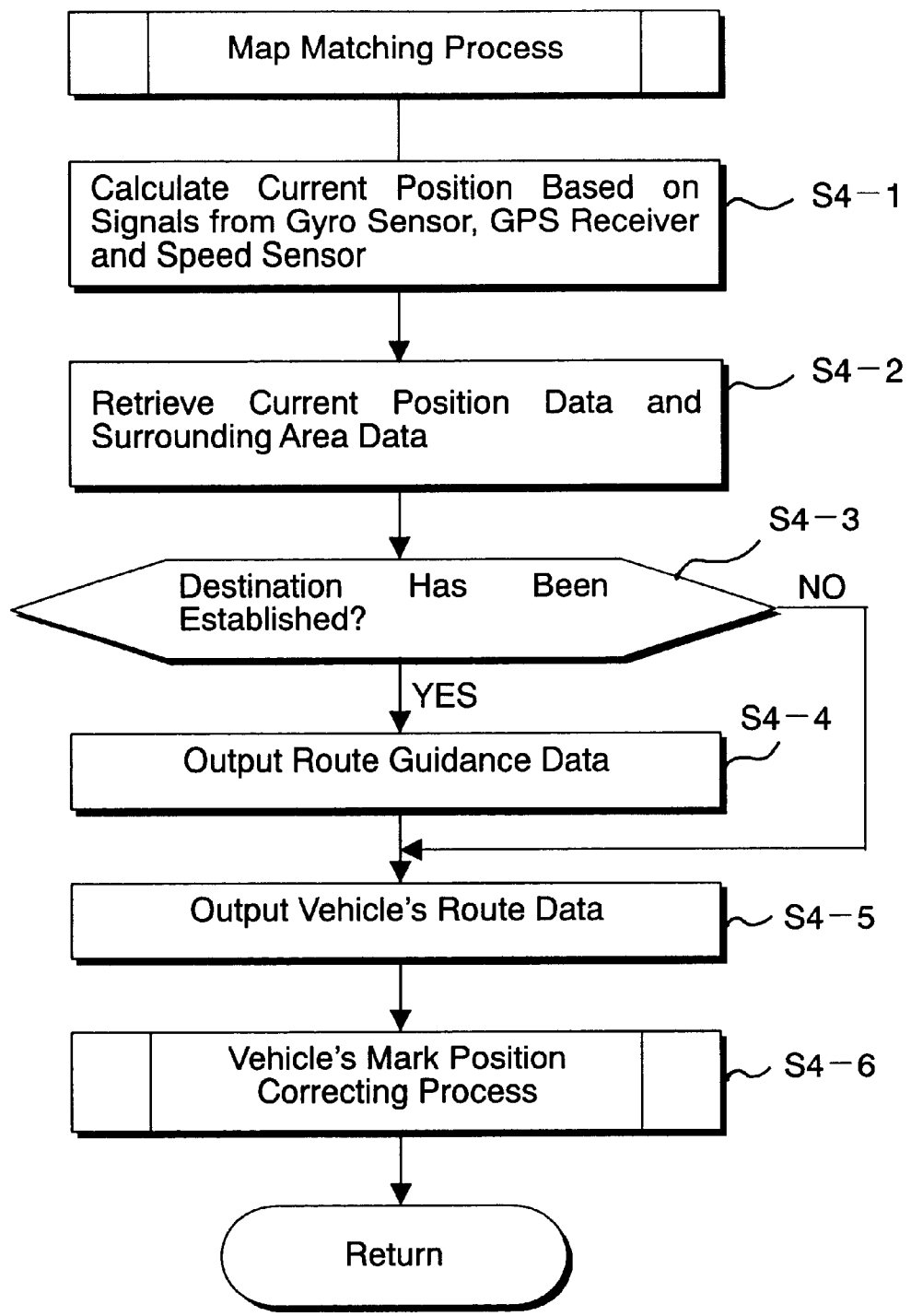
FIG. 6 is a flowchart which shows a map matching process routine executed by the navigation apparatus.

Next, the flow chart shown in FIG. 6 will be described. FIG. 6 is a flowchart which shows the map matching process routine executed by the navigation apparatus.

Step S4-1: A current position is computed based on signals from the gyro sensor 22, the GPS receiver 23 and the speed sensor 93.
Step S4-2: Data including information related to the current position of the vehicle and a surrounding area thereof is retrieved from the database 24.
Step S4-3: A Judgment as to whether or not a destination has been established is carried out. In the case where it is judged that a destination has been established, the subroutine proceeds to Step S4-4. On the other hand, in the case where it is judged that a destination has not been established, the subroutine skips to Step S4-5.
Step S4-4: Route guidance data is outputted.
Step S4-5: Vehicle's route data (which includes data of the "shape" of a vehicle's route) is outputted.
Step S4-6: Vehicle's mark position correcting process is carried out, and then the subroutine returns to the main routine.

Figure 7:
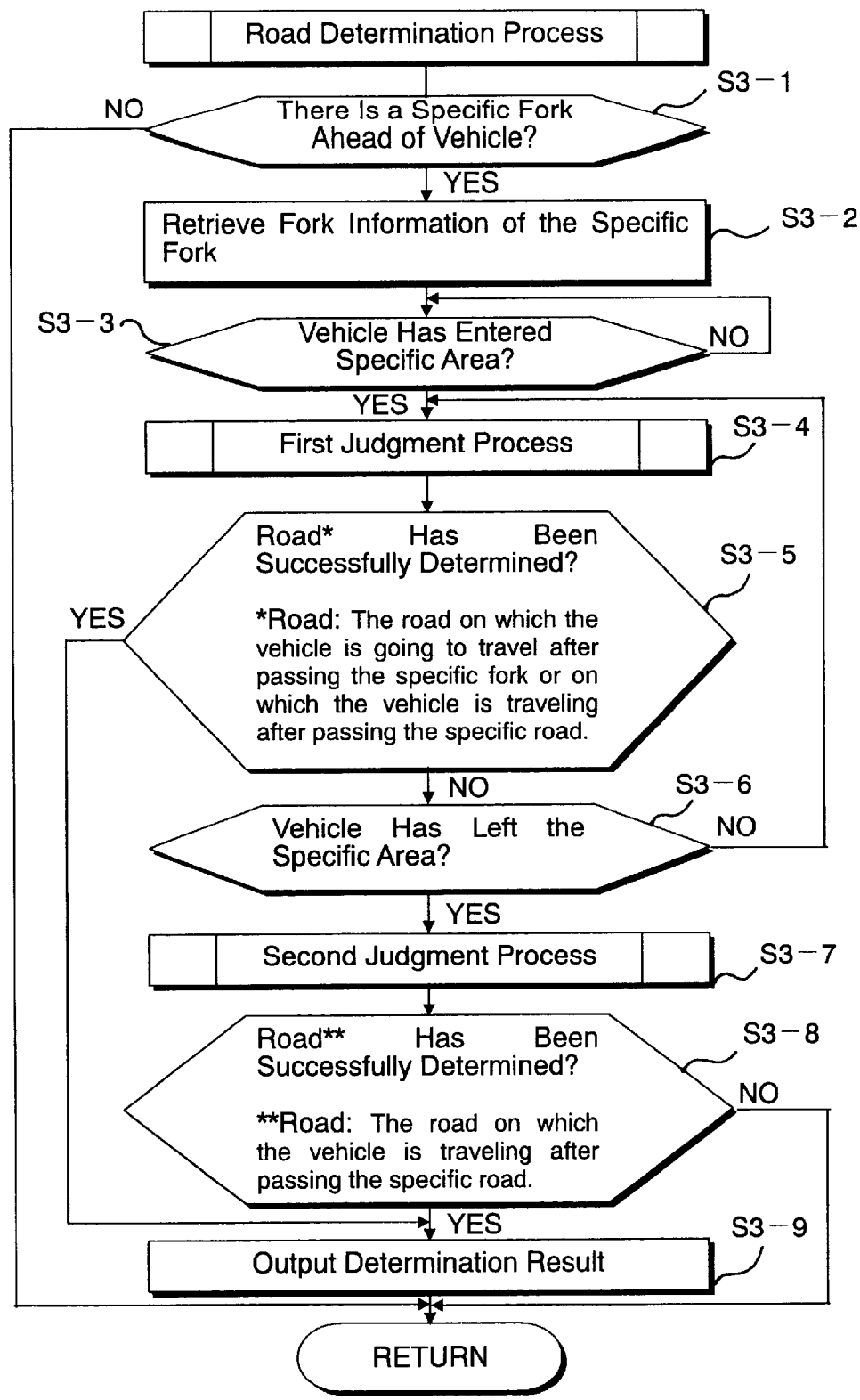
FIG. 7 is a flowchart which shows a road determination process routine executed by the navigation apparatus.
Figure 8:
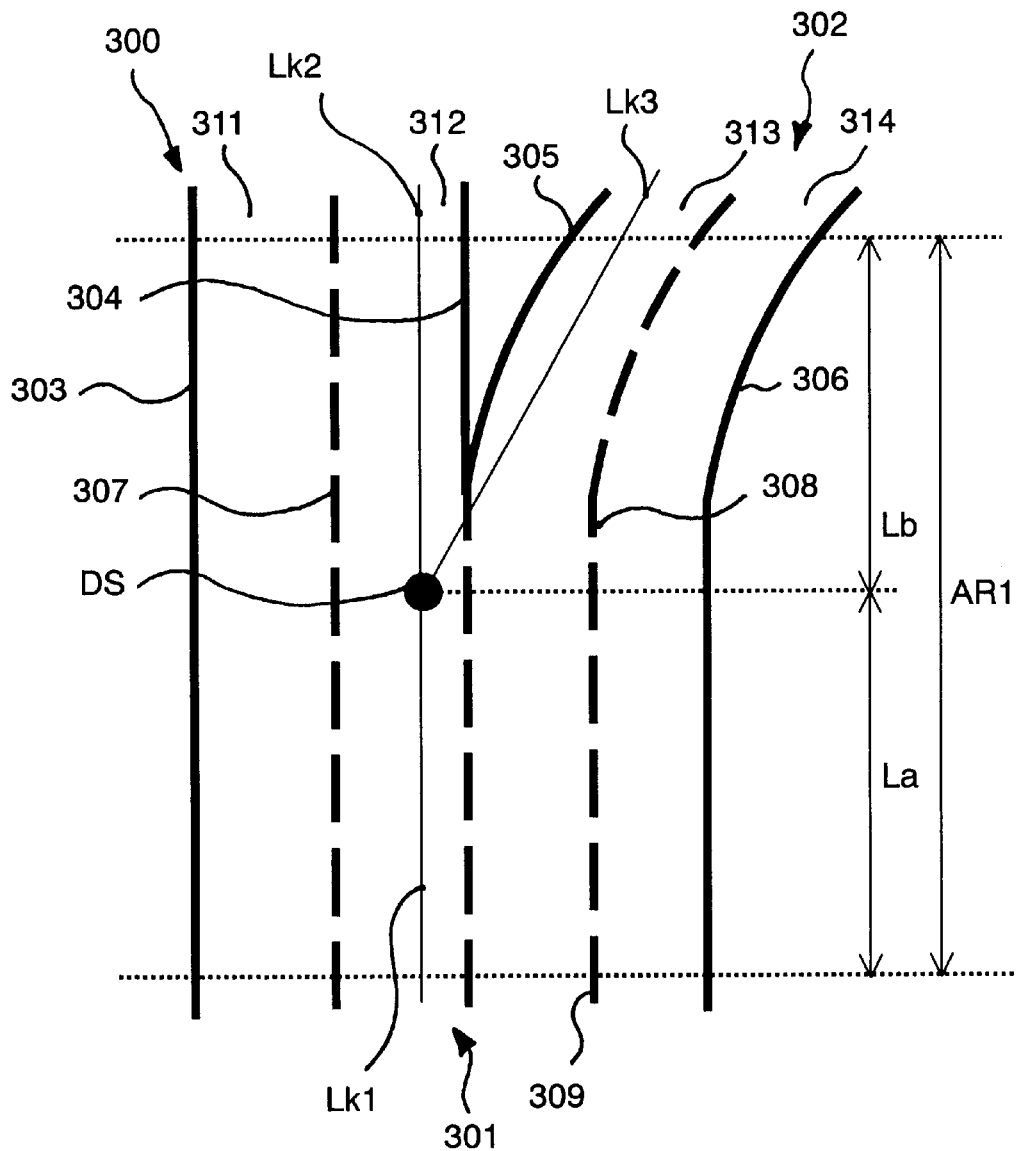
FIG. 8 shows an example of a road having a specific fork where a roadway divides into a main way and a branch way.
Figure 9:
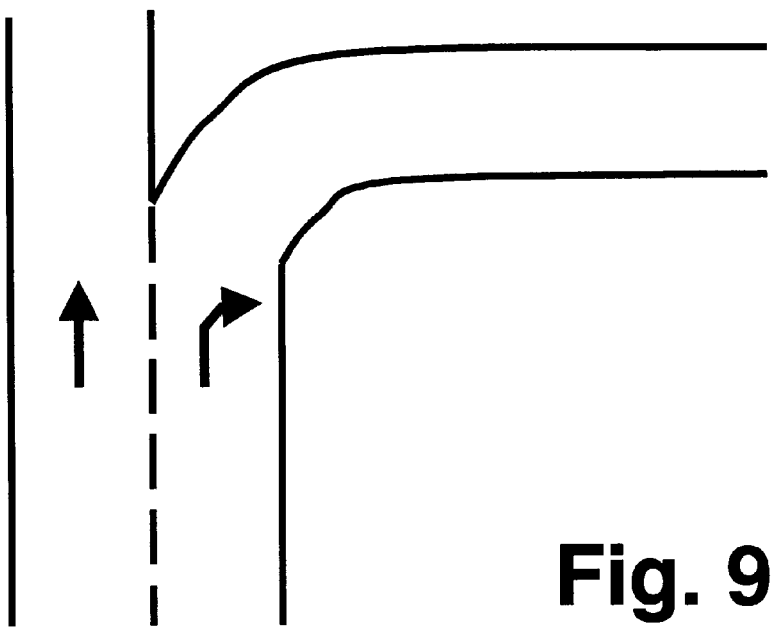
FIG. 9 is an example of a road having a fork that is not judged to be a specific fork.
Figure 10:
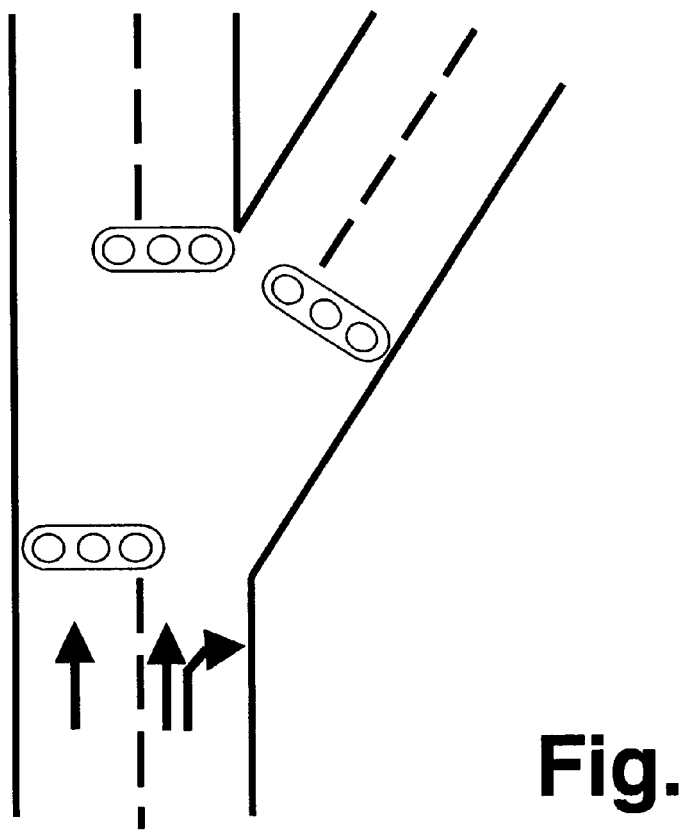
FIG. 10 is another example of a road having a fork that is not judged to be a specific fork.

Hereinafter, the road determination process at Step S3 in FIG. 5 will be described in more detail with reference to FIGS. 7–11. FIG. 7 is a flowchart which shows a road determination process routine executed by the navigation apparatus. FIG. 8 shows an example of a road having a specific fork where a roadway divides into a main way and a branch way. FIG. 9 is an example of a road having a fork that is not judged to be a specific fork. FIG. 10 is another example of a road having a fork that is not judged to be a specific fork. FIG. 11 shows detection results which can be obtained by processing images from the camera 11 of the navigation apparatus, and meaning of each detection result.

The example shown in FIG. 8 has a roadway 301 and a fork DS where the roadway 301 divides into a main way 300 and a branch way 302. The roadway 301 has four lanes which are defined by three broken-line lane markers 307–309 and two solid-line lane markers 303 and 306. The main way 300 has two lanes 311 and 312 which are defined by the broken-line lane marker 307 and two solid-line lane markers 303 and 304. The branch way 302 has two lanes 313 and 314 which are defined by the broken-line lane marker 308 and two solid-line lane markers 305 and 306. Further, in the example shown in FIG. 8, "AR1" denotes a specific area that is set with respect to the fork DS. In this embodiment, the specific area "AR1" starts at a first distance La (e.g., 300 m) in front of the fork DS and ends at a second distance Lb (e.g., 150 m) after the fork d1.

In this connection, it is to be noted that examples of a fork in this invention include various forks such as a fork in a junction, a fork in a freeway exit and the like. Further, examples of a branch way include a ramp way (i.e., off-ramp) of a freeway, a branch road from a freeway and the like.

In the node data stored in the database 24, each road is represented by a plurality of links each of which connects adjacent nodes, and each fork is represented by a node where three or more links join together. For example, in the road shown in FIG. 8, the fork DS is represented by a node where three links Lk1–Lk3 join together.

When the vehicle traveling the roadway 301 approaches the fork DS as shown in FIG. 8, first the navigation apparatus reads out route/map data for its surrounding area from the database 24, and then judges whether or not a specific fork is located ahead of the current position of the vehicle based on the read out route/map data. Specifically, in this judgment, first the navigation apparatus judges whether or not a fork is located ahead of the current position of the vehicle. Then, in the case where a fork is located ahead of the current position of the vehicle, the navigation apparatus further judges whether or not the fork satisfies both the following two conditions (a) and (b). (The following conditions are described with reference to the example shown in FIG. 8.) In the following, a fork which satisfies both the following two conditions (a) and (b) is referred to as a "specific fork".

Condition (a): The angle formed by the links Lk2 and Lk3 is less than or equal to 45 degrees. (The angle is calculated based on the link angle at the node where the links Lk2 and Lk3 join together.)

Condition (b): There are no traffic lights at the fork DS.

In the case where it is judged that the fork satisfies both the conditions (a) and (b), the navigation apparatus judges that a specific fork is located ahead of the vehicle. When the vehicle approaches such a specific fork, the navigation apparatus carries out the road determinations process to determine the traveling road on which the vehicle is going to travel after passing the specific fork or on which the vehicle is traveling after passing the specific fork.

For example, in the case where the angle formed by the links Lk2 and Lk3 shown in FIG. 8 is greater than 45 degrees, the fork DS is not judged to be a specific fork. In this case, the navigation apparatus does not carry out the road determination process, even when the vehicle passes the fork. This is because in the case where the angle is greater than 45 degrees as shown in FIG. 9, just after passing the fork the navigation apparatus can properly carry out the map matching process without depending on the above-mentioned road determination process.

Further, in the case where there are traffic lights at an intersection having a fork, the fork is also not judged to be a specific fork. In this case, the navigation apparatus does not carry out the road determination process, even when the vehicle passes the intersection. This is because in the case where there are traffic lights in a fork, it is considered that as show in FIG. 10, usually no lane markers are painted in the intersection, and in such a case the navigation apparatus cannot detect and monitor any lane markers to determine the traveling road after passing the fork.

In this way, because the road determination process is not carried out in the case where either the above-mentioned Condition (a) or (b) is not satisfied, it is possible to prevent the accuracy in the road determination process from being lowered. This makes it possible to prevent the accuracy in the road determination process from being lowered.

In this invention, instead of making a judgment as described above, the navigation apparatus may find a specific fork located ahead of the vehicle as follows. Namely, in addition to the above-mentioned fork flag indicating whether or not a node represents a fork, a specific-fork flag indicating whether or not a node represents a specific fork may be established in the node data in the route/map data. By checking a state of each of the flags, the navigation apparatus can make a judgment as to whether or not a specific fork is located ahead of the current position of the vehicle. In this case, the navigation apparatus does not make the judgment which is carried out based on the above-mentioned Condition (a) and (b).

When the navigation apparatus has judged that there is a specific fork (hereinafter, referred to simply as a "fork DS") in front of the vehicle through the judgment process described above, the fork information retrieving section 92 retrieves fork information of the fork DS from the route/map data.

In this connection, as described with reference to FIG. 3, fork information of each specific fork in road is stored in association with at least two predetermined conditions related to features of the specific fork. For example, in the case of the fork DS shown in FIG. 8, fork information of the fork DS is stored in association with predetermined conditions (which will be described later in more detail) related to features of the fork DS. Such features of the fork DS are determined based on the following points (i)–(vii).
(i) Relationship between the roadway 301, main way 300 and branch way 302.
(ii) The number of lanes of the roadway 301.
(iii) The number of lanes of the main way 300.
(iv) The number of lanes of the branch way 302.
(v) The type of each of the lane markers which define four lanes of the road way 301.
(vi) The type of each of the lane markers which define two lanes of the main way 300.
(vii) The type of each of the lane markers which define two lanes of the branch way 302.

After the retrieval of the fork information, the navigation apparatus makes a judgment as to whether or not the vehicle has entered the specific area AR1 that is set with respect to the fork DS. When judged that the vehicle has entered the specific area AR1, the navigation apparatus executes a first determination process of the road determination process based on lane markers detected and monitored by the lane marker detector 14. (This process is executed when the vehicle is within the specific area AR1.) Specifically, when executing the first determination process, the navigation apparatus checks the state of each of the above-mentioned solid-line judgment flag, broken-line judgment flag, right-ward lane-change judgment flag, and leftward lane-change judgment flag (each of which is set in an ON or OFF state). Then, based on the state of each flag, the navigation apparatus determines the traveling road on which the vehicle is going to travel after passing the fork DS (or on which the vehicle is traveling after passing the fork DS). This determination is carried out by judging which one of predetermined conditions (which will be described later in detail) related to the fork DS is satisfied.

In more detail, when the vehicle is within the specific area AR1, the image processor 12 of the navigation apparatus processes images taken by the camera 11, and the lane marker detector 14 detects and monitors lane markers on the road using the processed images to obtain at least one of the detection results 1–6 shown in FIG. 11. Hereinafter, the detection results shown in FIG. 11 will be described in the following items (1)–(6).

(1) Result 1
Result 1 is obtained in the case where the vehicle is traveling in a lane which is defined by "two solid lines" when the vehicle is within a specific area. This detection result means that the vehicle is traveling on a single-lane road.

(2) Result 2
Result 1 is obtained in the case where the vehicle is traveling in a lane which is defined by "two broken lines" when the vehicle is within a specific area. This detection result means that the vehicle is traveling in a center lane (or one of center-side lanes) of a road having three or more lanes.

(3) Result 3
Result 3 is obtained in the case where the vehicle is traveling in a lane which is defined by a "left-hand broken line" and a "right-hand solid line" when the vehicle is within a specific area. This detection result means that the vehicle is traveling in the rightmost lane of a road having two or more lanes.

(4) Result 4
Result 4 is obtained in the case where the vehicle is traveling in a lane which is defined by a "left-hand solid line" and a "right-hand broken line" when the vehicle is within a specific area. This detection result means that the vehicle is traveling in the leftmost lane of a road having two or more lanes.

(5) Result 5
Result 5 is obtained in the case where a left-hand lane marker is moving from the left side to the right side within digital images from the camera 11 when the vehicle is within a specific area. This detection result means that the vehicle is changing lanes to get into an adjacent lane on the left side.

(6) Result 6
Result 6 is obtained in the case where a right-hand lane marker is moving from the right side to the left side within digital images from the camera 11 when the vehicle is within a specific area. This detection result means that the vehicle is changing lanes to get into an adjacent lane on the right side.

The navigation apparatus obtains any one or more of Results (detection results) shown in FIG. 11 by processing images taken by camera 11, when the vehicle is within the specific area AR1. Then, before exiting from the specific area AR1, based on the obtained detection result (s), the navigation apparatus executes the first determination process of the road determination process to judge which one of predetermined conditions related to the fork DS is satisfied.

In the case where one of the predetermined conditions has been judged to be satisfied through the first determination process, the navigation apparatus determines the traveling road on which the vehicle is going to travel after passing the fork DS (or on which the vehicle is traveling after passing the fork DS). On the other hand, in the case where the navigation apparatus has not successfully determined the traveling road, the navigation apparatus executes the second determination process after the vehicle has left the specific area AR1.

In the second determination process, the navigation apparatus judges which one of another predetermined conditions is satisfied based on the obtained detection result(s), after the vehicle has left the specific area AR1. In this connection, it is to be noted that the navigation apparatus executes the second determination process based on the detection result (s) obtained when the vehicle was within the specific area AR1, and that the second determination process is executed when the vehicle has left the specific area AR1. In this way, the navigation apparatus determines the traveling road on which the vehicle is traveling after passing the fork DS.

Next, the navigation apparatus judges whether or not the traveling road has been successfully determined through the road determination process. In the case where it is judged that the traveling road has successfully determined, the navigation apparatus outputs the determination result.

Next, based on the determination result, the navigation apparatus judges whether or not the vehicle's actual location on the road is exactly displayed on the digital road map on the screen. In the case where it is judged that the vehicle's actual location on the road is NOT exactly displayed on the digital road map, the navigation apparatus executes the map matching process to correct the vehicle's position (i.e., position of the vehicle's mark) displayed on the digital road map based on the determination result (i.e., determined road). In this way, the vehicle's location is exactly displayed on the digital road map so that the road on which the vehicle is actually traveling immediately after passing the fork DS just corresponds to the road image along which the vehicle's mark is moving. However, in the case where it is judged that the vehicle's actual location on the road is exactly displayed on the digital road map, the navigation apparatus does not execute the map matching process as described above.

Figure 12:
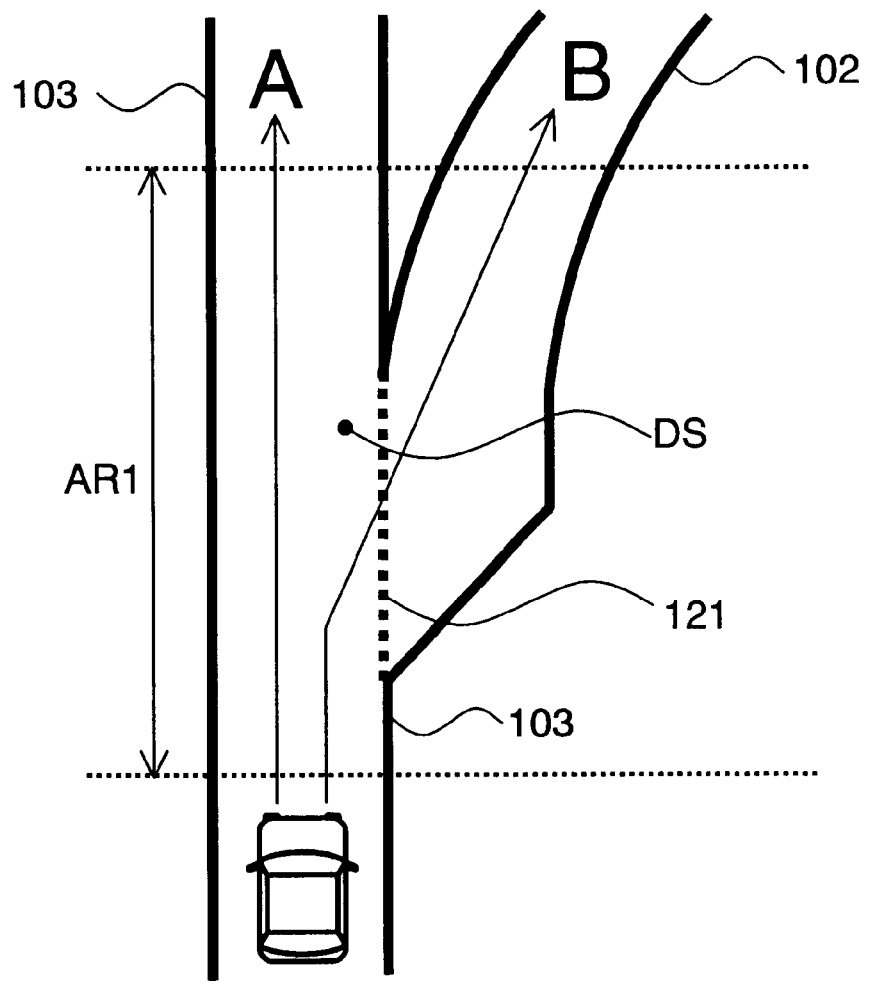
FIG. 12 shows an example of a first type road having a specific fork, in which two traveling courses between which a driver can choose are indicated by arrows.

Hereinafter, the road determination process mentioned above are described in more detail with reference to FIG. 12. FIG. 12 shows an example of a first type road having a specific fork.

In the example shown in FIG. 12, a single-lane main way 103 has a fork DS (specific fork) at which a branch way 102 branches off from the main way 103. In this drawing, the reference numeral 121 denotes a dotted-line lane marker for defining a lane boundary between the main way 103 and an entrance lane to the branch way 102. In this connection, it is to be noted that as shown in FIG. 12 line segments of the dotted-line lane marker 121 are painted with shorter gaps as compared with those of the broken-line lane marker as shown in FIG. 8. Therefore, when the vehicle is traveling on the side of the dotted-line lane marker 121, this lane marker is recognized as a "solid" line type lane marker by the lane marker detector 14.

With regard to the fork DS having the above feature, the driver of the vehicle traveling on the main way 103 can choose either the traveling course A or B indicated by the arrows in FIG. 12.

When the vehicle passes the fork DS as shown in FIG. 12, first the navigation apparatus executes the first determination process of the road determination process to determine the traveling road (i.e., the main way 103 or the branch way 102) on which the vehicle is going to travel after passing the fork DS or on which the vehicle is traveling after passing the fork DS. This first determination process is made based on (i) a detection result(s) (i.e. , one or more of Results 1–6 shown in FIG. 11) obtained when the vehicle is within the specific area AR1 and (ii) one of predetermined two conditions related to the fork DS. Specifically, when the vehicle is within the specific area AR1, the navigation apparatus tries to determine the traveling road by judging whether or not the following condition (a) is satisfied.

Condition (a): Result 6 occurs, when the vehicle is within the specific area AR1. (This condition is one of predetermined conditions used in this invention.)

In the case where Result 6 does not occur when the vehicle is within the specific area AR1 (i.e., when the navigation apparatus has not successfully determined the traveling road through the first determination process described above), the navigation apparatus executes the second determination process to determine the traveling road on which the vehicle is traveling after passing the fork DS. This determination process is made based on (i) the detection result(s) obtained when the vehicle was within the specific area AR1 and (ii) the other predetermined condition related to the fork DS. Specifically, after exiting from the specific area AR1, the navigation apparatus determines the traveling road by judging whether or not the following condition (b) is satisfied.

Condition (b): Neither Result 5 nor 6 occurred, when the vehicle was within the specific area AR1. (This condition is also one of predetermined conditions used in this invention.)

For example, in the case where the vehicle takes Course B in which it travels on the main way 103 and then changes lanes to get into the entrance lane to the branch way 102, the dotted-line lane marker 121 moves from the right side to the left side within digital images from the camera 11. In such a case, the navigation apparatus judges that the above-mentioned condition (a) has been satisfied when the vehicle is within the specific area AR1. Based on this judgment, through the first determination process the navigation apparatus determines that the road on which the vehicle is going to travel after passing the fork DS (or on which the vehicle is traveling after passing the fork DS) is the branch way 102.

On the other hand, in the case where the vehicle takes Course A in which it travels straight on the main way 103 without changing lanes, the movement of the dotted-line lane marker 121 within the digital images is not detected, that is, neither Result 5 nor 6 occurs when the vehicle is within the specific area AR1. In such a case, after exiting from the specific area AR1, the navigation apparatus judges that the above-mentioned condition (b) has been satisfied. Based on this judgment, the navigation apparatus determines that the traveling road on which the vehicle is traveling after passing the fork DS is the main way 103.

In the road determination process described above, the determination is carried out in two stages. Specifically, in the first determination process (first stage), the navigation apparatus tries to determine the traveling road based on (i) a predetermined condition(s) related to a specific fork and (ii) a detection result(s) (i.e., any one or more of Results 1–6 shown in FIG. 11) obtained when the vehicle is within a specific area. This first determination process is carried out when the vehicle is within a specific area. Further, in the case where the navigation apparatus has not successfully determined the traveling road through the first determination process described above, the navigation apparatus executes the second determination process (second stage) to determine the traveling road. In this second determination process, the navigation apparatus tries to determine the traveling road based on (i) another predetermined condition(s) related to the specific fork and (ii) the detection result(s) obtained when the vehicle was within the specific area. This second determination process is carried out when the vehicle has left the specific area AR1. According to the road determination processes described above, it is possible for the navigation apparatus to exactly determine the traveling road on which the vehicle is going to travel after passing the specific fork (or on which the vehicle is traveling after passing the specific fork).

Further, in the road determination process described above, the navigation apparatus does not depend on lane markers outside the specific area to determine the traveling road. This prevents the lane marker detection accuracy from being lowered due to, for example, shadows from other vehicles and the like.

Further, in the case where the traveling road has been successfully determined through the first determination process (first stage), it is possible for the navigation apparatus to know the traveling road just after passing a specific fork but before exiting the specific area. Therefore, if needed, the navigation apparatus can perform the map matching process properly just after passing the specific fork. This is advantageous in that the accurate positional information is provided to the driver via the display immediately after passing the specific fork.

In addition, by determining the traveling road in the manner as described above, the navigation apparatus can perform the map matching process more properly. Specifically, it is possible for the navigation apparatus to accurately match the vehicle's actual location on the road to its position on the digital road map on the screen, based on the determination result obtained through the road determination process. Further, if the vehicle's actual location is displayed at a wrong position on the digital road map, the navigation apparatus can also correct the position so that the road on which the vehicle is actually traveling immediately after passing the fork DS just corresponds to the road image along which the vehicle's mark is moving on the digital road map.

Next, the subroutine shown in FIG. 7 will be described with reference to the example shown in FIG. 8.

Step S3-1: (The judgment process in this step corresponds to the "first judging means" in this invention.)

In this step, a judgment as to whether or not a specific fork is located ahead of the current position of the vehicle is carried out. In the case where it is judged a specific fork (fork DS) is located ahead of the vehicle, the subroutine proceeds to Step S3-2. On the other hand, in the case where it is judged a specific fork is NOT located ahead of the vehicle, the subroutine returns to the main routine.

Step S3-2: (The process in this step corresponds to the "retrieval means" in this invention.)

In this step, fork information of the fork DS is retrieved from the database 24.

Step S3-3: (The judgment process in this step corresponds to the "second judging means" in this invention.)

In this step, a judgment as to whether or not the vehicle has entered the specific area AR1 is carried out. In the case where it is judged that the vehicle has entered the specific area AR1, the subroutine proceeds to Step S3-4. On the other hand, in the case where it is judged that the vehicle has not entered the specific area AR1, the subroutine goes into a standby mode.

Step S3-4: (The process in this step corresponds to the "first means" of the road determining means in this invention.)

In this step, the first determination process described above is carried out.

Step S3-5: (The judgment process in this step corresponds to the "fourth judging means" in this invention.)

In this step, a judgment as to whether or not in the Step S3-4 the navigation apparatus has successfully determined the traveling road is carried out. In the case where it is judged that the traveling road has been successfully determined, the subroutine skips to Step S3-9. On the other hand, in the case where it is judged that the traveling road has NOT been successfully determined, the subroutine proceeds to Step S3-6.

Step S3-6: (The judgment process in this step corresponds to the "third judging means" in this invention.)

In this step, a judgment as to whether or not the vehicle has left the specific area AR1 is carried out. In the case where it is judged that the vehicle has left the specific area AR1, the subroutine proceeds to Step S3-7. On the other hand, in the case where it is, judged that the vehicle has NOT left the specific area AR1, the subroutine returns to Step S3-4.

Step S3-7: (The process in this step corresponds to the "second means" of the road determining means in this invention.)

In this step, the second determination process described above is carried out.

Step S3-8

In this step, a judgment as to whether or not in the Step S3-7 the navigation apparatus has successfully determined the traveling road is carried out. In the case where it is judged that the traveling road has been successfully determined, the subroutine skips to Step S3-9. On the other hand, in the case where it is judged that the traveling road has NOT been successfully determined, the subroutine returns to the main routine.

Step S3-9

In this step, the determination result at Step S3-4 or S3-7 is outputted, and then the subroutine returns to the main routine.

Figure 13:
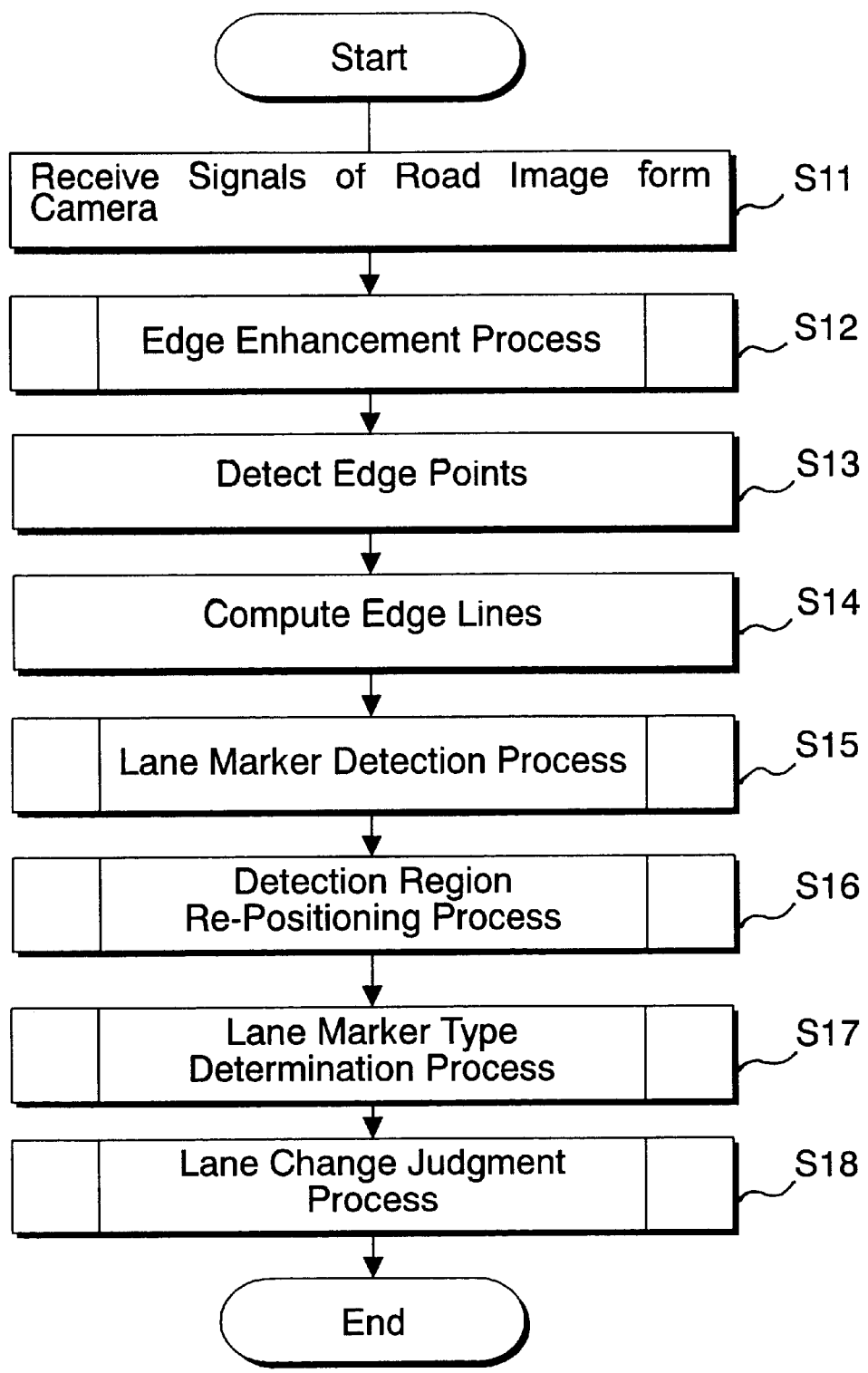
FIG. 13 is a flowchart which shows a main routine executed by a lane marker detector of the navigation apparatus.
Figure 14:
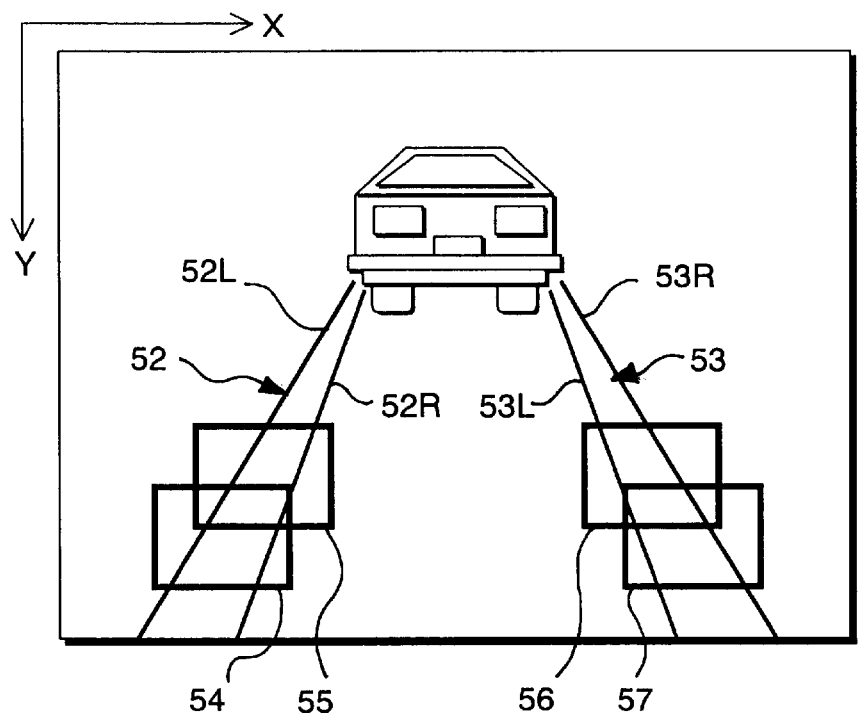
FIG. 14 shows an example of a digital roadway image taken by the camera of the navigation apparatus.
Figure 15:
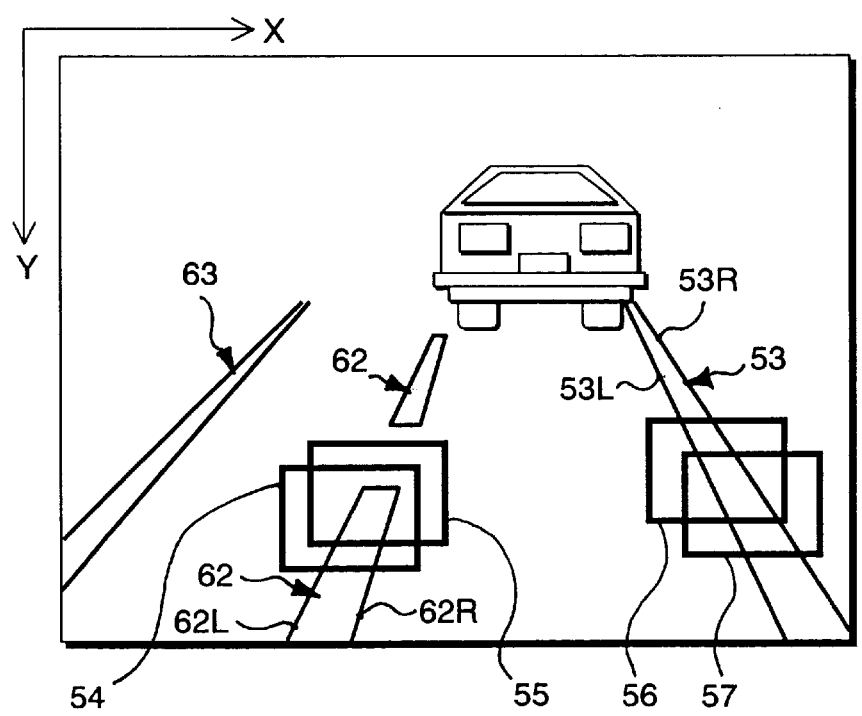
FIG. 15 shows another example of the digital roadway image.

Hereinafter, the operations of the lane marker detector 14 of the navigation apparatus will be described with reference to FIGS. 13–15. FIG. 13 is a flowchart which shows a main routine executed by the lane marker detector 14 of the navigation apparatus. FIG. 14 shows an example of a digital roadway image taken by the camera 11 of the navigation apparatus. FIG. 15 shows another example of the digital roadway image.

First, an image of a roadway scene ahead of the vehicle is taken by the camera 11, and then signals of the image is send to the image processor 12 of the lane marker detector 14. Then, the image processor 12 processes the image taken by the camera 11 to produce a digital image as shown in FIGS. 14 or 15. In the digital image, the upper left corner of the image forms the origin, the X-axis extends toward the right from the origin, and the Y-axis extends downward from the origin.

In the digital image shown in FIG. 14, the reference numeral 52 denotes a solid-line lane marker painted on the left side of the lane in which the vehicle is traveling. The reference numeral 52L denotes a left edge of the left-hand lane marker 52. The reference numeral 52R denotes a right edge of the left-hand lane marker 52. The reference numeral 53 denotes a solid-line lane marker painted on the right side of the lane in which the vehicle is traveling. The reference numeral 53L denotes a left edge of the right-hand lane marker 53. The reference numeral 53R denotes a right edge of the right-hand lane marker 53.

In the digital image shown in FIG. 15, the reference numeral 62 denotes the broken-line lane marker painted on the left side of the lane in which the vehicle is traveling. The reference numeral 63 denotes a solid-line lane marker painted on the left side of the left-side adjacent lane. The reference numeral 62L denotes a left edge of the left-hand lane marker 62. The reference numeral 62R denotes a right edge of the left-hand lane marker 62. The reference numeral 53 denotes a solid-line lane marker painted on the right side of the lane in which the vehicle is traveling. The reference numeral 53L denotes a left edge of the right-hand lane marker 53. The reference 53R denotes a right edge of the right-hand lane marker 53.

Then, as shown in FIG. 14, the lane marker detector 14 establishes rectangular detection regions 54–57 on the right and left lane markers 52 and 53 inside the digital image. Then, the lane marker detector 14 carries out an edge enhancement process for image data inside the detection regions 54–57 to create edge images. In this regard, the edge enhancement process can be carried out using Sobel filtering process, Laplacian filtering process, or the like.

In the digital images shown in FIGS. 14 and 15, the detection region 54 is established to detect edge points corresponding to the left edge 52L (62L) of the left-hand lane marker 52 (62). The detection region 55 is established to detect edge points corresponding to the right edge 52R (62R) of the right-hand lane marker 52 (62). The detection region 56 is established to detect edge points corresponding to the left edge 53L of the right-hand lane marker 53. The detection region 57 is established to detect edge points corresponding to the right edge 53R of the right-hand lane marker 53. For convenience' sake in describing this embodiment, the two detection regions 54 and 55 and the two detection regions 56 and 57 are shown shifted up and down from each other as shown in FIGS. 14 and 15, but it is of course possible for each of the detection regions 54–57 to have the same Y-axis coordinates.

In this embodiment, the detection regions 54–57 are established in the digital image in order to shorten the time required for carrying out the edge enhancement process, and the edge enhancement process is carried out for the image data only inside the detection regions 54–57. However, in this invention, the edge enhancement process may be carried out for the entire digital image taken by the camera 11.

Next, a description will be given for the method of detecting the edge points corresponding to the left edge 52L (62L) and the right edges 52R (62R) of the left-hand lane marker 52 (62), and the edge points corresponding to the left edge 53L and right edge 53R of the right-hand lane marker 53.

First, the lane marker detector 14 of the navigation apparatus establishes a plurality of scanning lines (not shown in the drawings) inside each of the detection regions 54 and 56 for detecting edge points corresponding to the left edges 52L (62L) and 53L. Then, the lane marker detector 14 carries out a pixel scanning process to scan light intensity of each of the pixels making up the digital image inside the detection regions 54 and 56. This scanning process is carried out along each of the established scanning lines in a sequential order from the left end. In the pixel scanning process for one scanning line, the lane marker detector 14 makes a judgment for each pixel as to whether or not light intensity of the pixel exceeds a predetermined threshold value, and stores into the work area memory 15 the X-axis coordinate and Y-axis coordinate of pixels whose light intensity exceeds the threshold value. (Hereafter, a pixel having light intensity that exceeds the threshold value is referred to simply as an "edge pixel.") When three edge pixels has been detected through the pixel scanning process for one scanning line, the scanning process for the scanning line is suspended, and then a scanning process is started for the next scanning line. In this way, three edge pixels are detected for each of the scanning lines inside the detection regions 54 and 56. In this connection, in the case where no edge pixel is detected through a scanning process for one scanning line, a scanning process is started for the next scanning line.

In this connection, the reason why the lane marker detector 14 detects "three" edge pixels in the above-mentioned pixel scanning process is as follows. Namely, it is considered that at least two edge pixels (which can theoretically be detected at the vicinity of a lane marker boundary) are detected when the edge enhancement process is carried out for single scanning line using the Sobel filtering process, Laplacian filtering process, or the like. However, during actual scanning process, there is a possibility that a pixel that is away from the lane marker boundary is detected as an edge pixel due to the presence of noises and the like. In view of such noises and the like, in this embodiment, the lane marker detector 14 is designed to detect three edge pixels.

Next, the lane marker detector 14 establishes a plurality of scanning lines (not shown in the drawings) inside each of the detection regions 55 and 57 for detecting edge points corresponding to the right edges 52R (62R) and 53R. Then, in the same manner as in the case of the detection regions 54 and 56, the lane marker detector 14 carries out the pixel scanning process to scan light intensity of each of the pixels making up the digital image inside the detection regions 55 and 57. In this way, three edge pixels are detected for each of the scanning lines inside the detection regions 55 and 57.

Next, based on the detected edge points in the detection regions 54–57, the lane marker detector 14 computes straight lines formed from the series of the detected edge points. (Hereafter, such a straight line is referred to simply as an "edge line.") In this regard, the computation of the edge lines may be carried out using a Hough transform technique, a least-squares method, or the like.

Next, the lane marker detector 14 carries out a lane marker detection process. (Hereinafter, the lane marker detection process is described with reference to the right-hand lane marker 53 in the digital image shown in FIG. 14.) In this process, the lane marker detector 14 calculates an edge line interval distance between a right edge line (which is assumed to represent the right edge 53R of the right-hand lane marker 53) and a left edge line (which is assumed to represent the left edge 53L of the right-hand lane marker 53). Then, the lane marker detector 14 makes a judgment as to whether or not the calculated distance exceeds a predetermined threshold value. In the case where the calculated distance has judged to exceed the threshold value, the lane marker detector 14 determines that the right and left edge lines represent the right and left edges 53R and 53L of the lane marker 53, respectively, whereby the right-hand lane marker 53 is detected.

Further, when the lane marker has been detected through the above-mentioned lane marker detection process, the lane marker detector 14 carries out a detection region re-positioning process. In this detection region re-positioning process, the lane marker detector 14 re-positions the detection regions 54–57 on the digital image so that the edge lines is at a predetermined position (e.g., at a center position) inside the respective detection regions in the continuous digital images. By continuously carrying out the detection region re-positioning process, it is possible to follow the lane markers within the continuous digital images. As a result, the navigation apparatus can monitor the movement of each of the lane makers within the continuous digital images.

Further, the lane marker detector 14 carries out a lane marker type determination process. In this determination process, the lane marker detector 14 determines the type of the detected lane marker by judging whether the lane marker is detected continuously or periodically. In the case where the lane marker is judged to be "continuously" detected, the lane marker detector 14 determines that it is a "solid-line" type lane marker, and sets the solid-line judgment flag in an ON state. On the other hand, in the case where the lane marker is judged to be "periodically" detected, the lane marker detector 14 determines that it is a "broken-line" type lane marker, and sets the broken-line judgment flag in an ON state.

Furthermore, the lane marker detector 14 carries out a lane-change judgment process. Hereinafter, the lane-change judgment process is described with reference to the example shown in FIG. 15.

For example, in the case where the vehicle changes lanes to get into an adjacent lane on the left side, in the continuous digital images from the camera 11 the left-hand lane marker 62 appears to move from the left side toward the right side. Further, according to the movement of the left-hand lane marker 62, each of the detection regions 54 and 55 required for detecting the left-hand lane marker 62 follows the lane marker 62 through the continuous detection region re-positioning processes. When the detection regions 54 and 55 have reached the center of the digital image through the continuous detection region re-positioning processes, the lane marker detector 14 sets the leftward lane-change judgment flag in an ON state. After the lane change to the adjacent lane (new lane) on the left side is completed, the lane marker detector 14 carries out initialization to position the detection regions 54–57 in their respective starting positions (original positions), and then carries out the lane marker detection process again to detect lane markers defining the new lane in which the vehicle is traveling after the lane change.

Next, the flow chart shown in FIG. 13 will be described.
Step S11: The lane maker detector 14 receives signals of a road image from the camera 11.
Step S12: The edge enhancement process is carried out with respect to lane markers defining a lane in which the vehicle is traveling.
Step S13: Edge points are detected.
Step S14: Edge lines are computed.
Step S15: The lane marker detection process is carried out.
Step S16: The detection region re-positioning process is carried out.
Step S17: The lane marker type determination process is carried out.
Step S18: The lane-change judgment process is carried out, and then the process is terminated.

Figure 16:
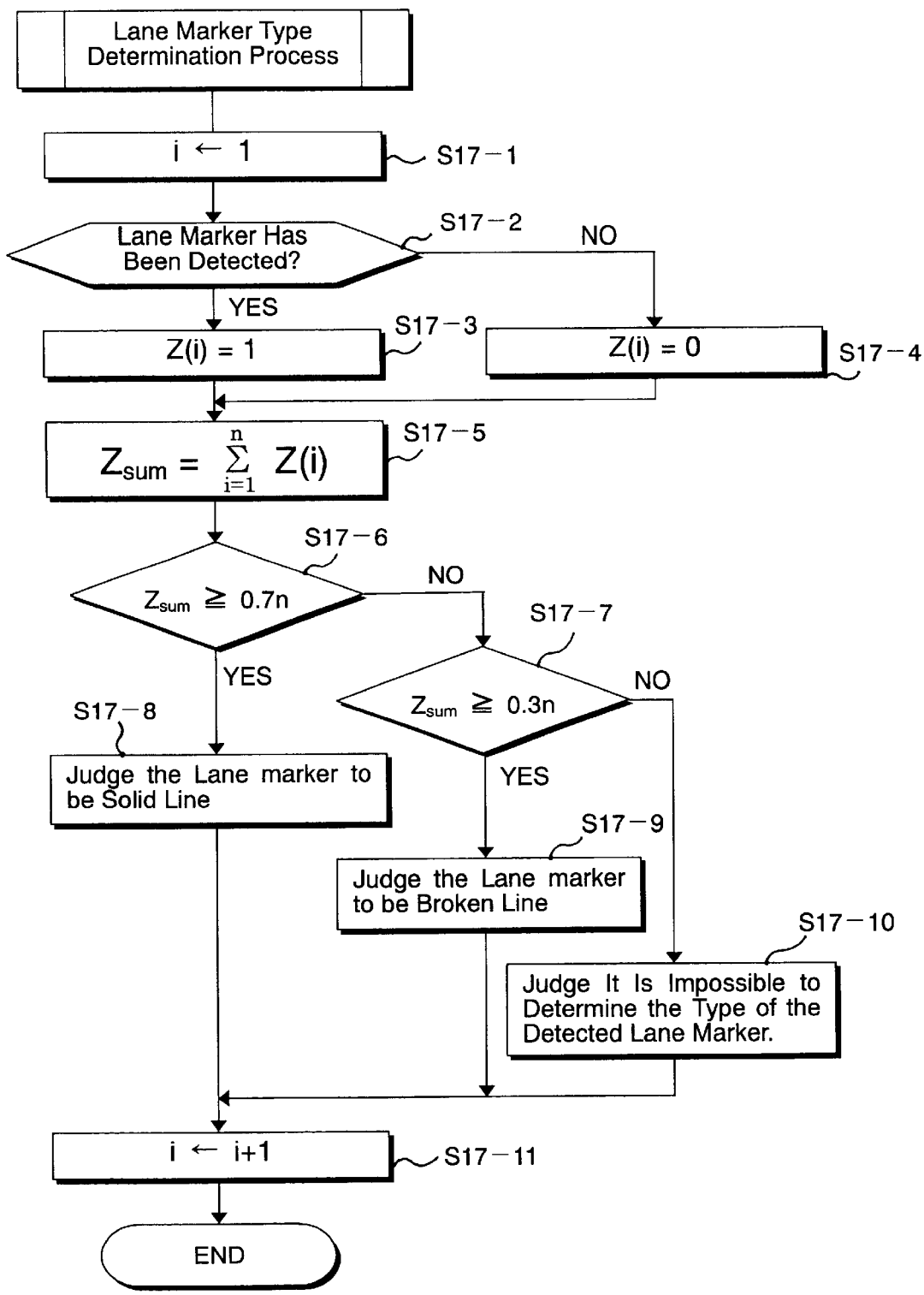
FIG. 16 is a flowchart which shows a lane marker type determination process routine executed by the lane marker detector of the navigation apparatus.

Hereinafter, the lane marker type determination process at Step S17 in FIG. 13 is described in more detail with reference to the flowchart shown in FIG. 16. FIG. 16 is a flowchart which shows a lane marker type determination process routine executed by the lane marker detector 14. The following description is given for the case where a judgment is made as to whether the type of the left-hand lane marker 52 shown in FIG. 14 is a solid line or a broken line.

In the lane marker type determination process, first, variable $Z(i)$ (where i=1, 2, ... n−1, n) having a value "1" when the lane marker 52 is detected and having a value "0" when no detection occurs is established by the lane marker detector 14. During the continuous lane marker type determination processes, the lane marker detector 14 holds values of n variables (i.e., variables $Z(1), Z(2), \ldots,$ and $Z(n)$) obtained in last "n" times attempts for detecting the lane marker 52.

The lane marker detector 14 calculates the sum "$Z_{sum}$" of values of the n variables $Z(i)$, that is, the sum "$Z_{sum}$" of values of the variables $Z(1), Z(2), Z(3) \ldots,$ and $Z(n)$. Then, by comparing the calculated value of the sum $Z_{sum}$ with a predetermined threshold value, the lane marker detector 14 makes a judgment as to whether the detected lane marker 52 is a solid or broken line.

For example, in the case where the type of the detected lane marker 52 is a broken line, the sum $Z_{sum}$ ideally has a value of approximately "n/2", since a lane marker is detected periodically and almost half of the variables $Z(i)$ have a value "1" or "o." On the other hand, in the case where the type of the detected lane marker 52 is a solid line, the sum $Z_{sum}$ ideally has a value "n", since a lane marker is detected continuously and the variable $Z(i)$ always has a value "1." However, under actual road conditions, even in the case where the lane marker is painted as a solid-line, the variable $Z(i)$ will not necessarily have a value "1." This is because there is a case that a lane marker partially comes off due to wear and the like.

In view of the actual road condition as described above, in this invention the lane marker detector 14 determines the type of the detected lane marker in the following manner. Namely, in the case where the sum $Z_{sum}$ is greater than or equal to "0.7n", the lane marker detector 14 determines that the type of the detected lane marker is a solid line. In the case where the sum $Z_{sum}$ is less than "0.7n" and greater than or equal to "0.3n", the lane marker detector 14 determines that the type of the detected lane marker is a broken line. In the case where the sum $Z_{sum}$ is less than 0.3n, the subroutine judges that it is impossible to determine the type of the detected lane marker.

Next, the flaw chart shown in FIG. 16 will be described.
Step S17-1
The value "i" of a variable $Z(i)$ is set to "1."
Step S17-2
A judgment as to whether or not a lane marker has been detected is carried out. In the case where it is judged that the lane marker has been detected, the subroutine proceeds to Step S17-3. On the other hand, it is judged that the lane marker has NOT been detected, the subroutine proceeds to Step S17-4.
Step S17-3
The variable $Z(i)$ is assigned the value "1."
Step S17-4
The variable $Z(i)$ is assigned the value "0."
Step S17-5
The sum $Z_{sum}$ of n variables $Z(i)$ is calculated.
Step S17-6
A judgment as to whether or not the sum $Z_{sum}$ is greater than or equal to "0.7n" is carried out. In the case where the sum $Z_{sum}$ is judged to be greater than or equal to "0.7n", the subroutine proceeds to Step S17-8. On the other hand, in the case where the sum $Z_{sum}$ is judged to be less then "0.7n", the subroutine proceeds to Step S17-7.
Step S17-7
A judgment as to whether or not the sum $Z_{sum}$ is greater than or equal to "0.3n" is carried out. In the case where the sum $Z_{sum}$ is judged to be greater than or equal to "0.3n", the subroutine proceeds to Step S17-9. On the other hand, in the case where the sum $Z_{sum}$ is judged to be less then 0.3n, the subroutine proceeds to Step S17-10.

Step S17-8

The lane marker detector 14 judges that the type of the detected lane marker is a solid line.

Step S17-9

The lane marker detector 14 judges that the type of the detected lane marker is a broken line.

Step S17-10

The lane marker detector 14 judges that it is impossible to determine the type of the detected lane marker.

Step S17-11

The value "i" of a variable Z(i) is raised by one increment.

Figure 17:
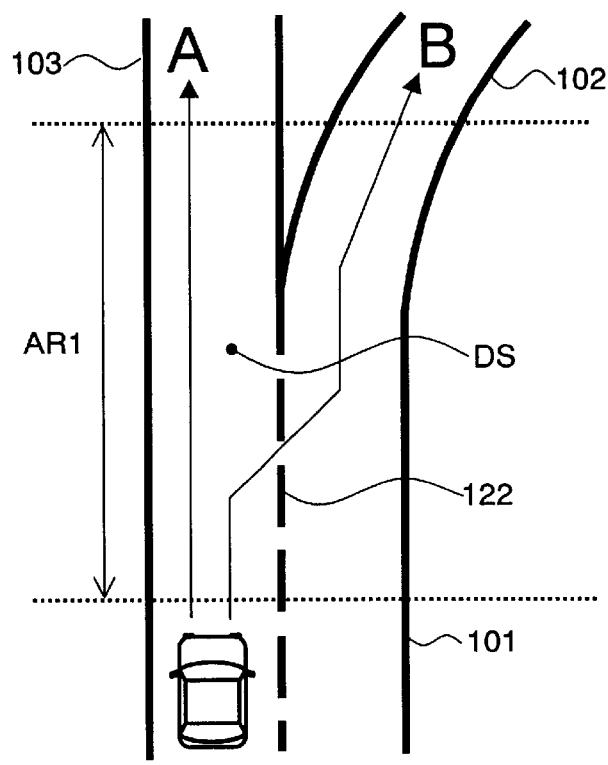
FIGS. 17 and 18 show an example of a second type road having a specific fork, in which four traveling courses between which the driver can choose are indicated by arrows.
Figure 18:
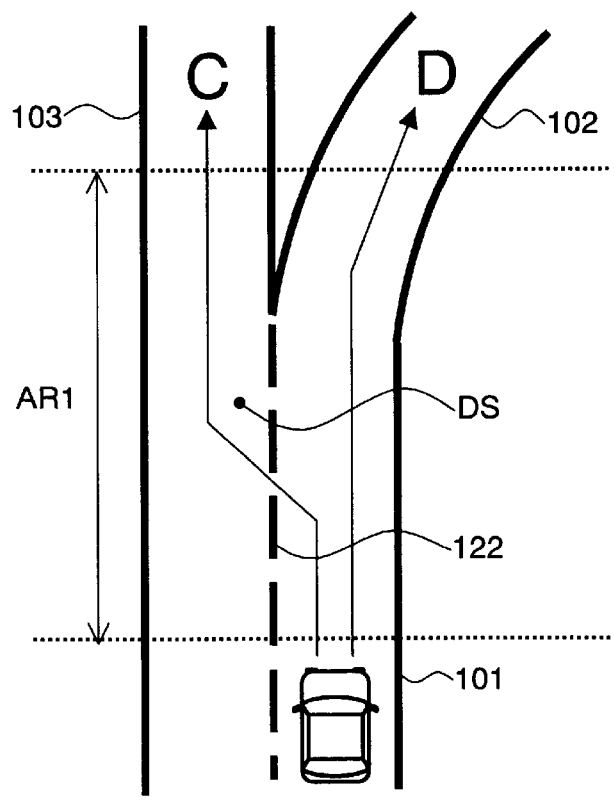

Next, a second example of the road determination process will be described with reference to FIGS. 17 and 18. FIGS. 17 and 18 show an example of a second type road having a specific fork.

In the example shown in FIGS. 17 and 18, a two-lane roadway 101 has a fork DS (specific fork) at which the roadway 101 divides into a single-lane main way 103 and a single-lane branch way 102. In these drawings, the reference numeral 122 denotes a broken-line lane marker that defines a lane boundary between an entrance lane to the main way 103 and an entrance lane to the branch way 102. The reference numeral AR1 denotes a specific area that is set with respect to the fork DS.

With regard to the fork DS having the above feature, the driver of the vehicle traveling on the roadway 101 can choose any one of the four traveling courses A–D indicated by the arrows in FIGS. 17 and 18.

When the vehicle passes the fork DS, first the navigation apparatus carries out the first determination process to determine the traveling road on which the vehicle is going to travel after passing the fork DS or on which the vehicle is traveling after passing the fork DS. This first determination process is made based on (i) a detection result(s) obtained when the vehicle is within the specific area AR1 and (ii) a set of predetermined conditions related to the fork DS. Specifically, when the vehicle is within the specific area AR1, the navigation apparatus determines the traveling road by judging which one of the following conditions (a) and (b) is satisfied. (The following conditions used in the road determination process are determined in association with the features of the fork DS, and they are described with reference to Results 1–6 in FIG. 11.)

Conditions Used in the First Determination Process

Condition (a): Result 5 occurs after Result 3 has occurred, when the vehicle is within the specific area AR1.

Condition (b): Result 6 occurs after Result 4 has occurred, when the vehicle is within the specific area AR1.

In the case where none of the above-mentioned Conditions (a) and (b) is satisfied when the vehicle is within the specific area AR1 (i.e., when the navigation apparatus has not successfully determined the traveling road in the first determination process described above), the navigation apparatus carries out the second determination process after leaving the specific area AR1 to try to determine the traveling road again. This second determination process is made based on (i) the detection result(s) obtained when the vehicle was within the specific area AR1 and (ii) another set of predetermined conditions related to the fork DS. Specifically, after leaving the specific area AR1 the navigation apparatus determines the traveling road by judging which one of the following conditions (c) and (d) is satisfied.

Conditions Used in the Second Determination Process

Condition (c): Result 1 occurred after Result 4 occurred, when the vehicle was within the specific area AR1.

Condition (d): Result 1 occurred after Result 3 occurred when the vehicle was within the specific area AR1.

For example, in the case where the vehicle takes Course C, the vehicle travels in a right-hand lane of the roadway 101 and then changes lanes to get into an adjacent lane on the left side. In this case, through the first determination process the navigation apparatus judges that the above-mentioned condition (a) has been satisfied, when the vehicle Is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course B, the vehicle travels in the left-hand lane of the roadway 101 and then changes lanes to get into an adjacent lane on the right side. In this case, through the first determination process the navigation apparatus judges that the above-mentioned condition (b) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course A, the vehicle travels straight in the left-hand lane of the roadway 101 without changing lanes and then gets into the main way 103. In this case, through the second determination process, the navigation apparatus judges that the above-mentioned condition (c) has-been satisfied. Based on this judgment, the navigation apparatus determines that the road on which the vehicle is traveling after passing the fork DS is the main way 103.

In the case where the vehicle takes Course D, the vehicle travels straight in the right-hand lane of the roadway 101 without changing lanes and then gets into the branch way 102. In this case, through the second determination process, the navigation apparatus judges that the above-mentioned condition (d) has been satisfied. Based on this judgment, the navigation apparatus determines that the road on which the vehicle is traveling after passing the fork DS is the branch way 102.

Figure 19:
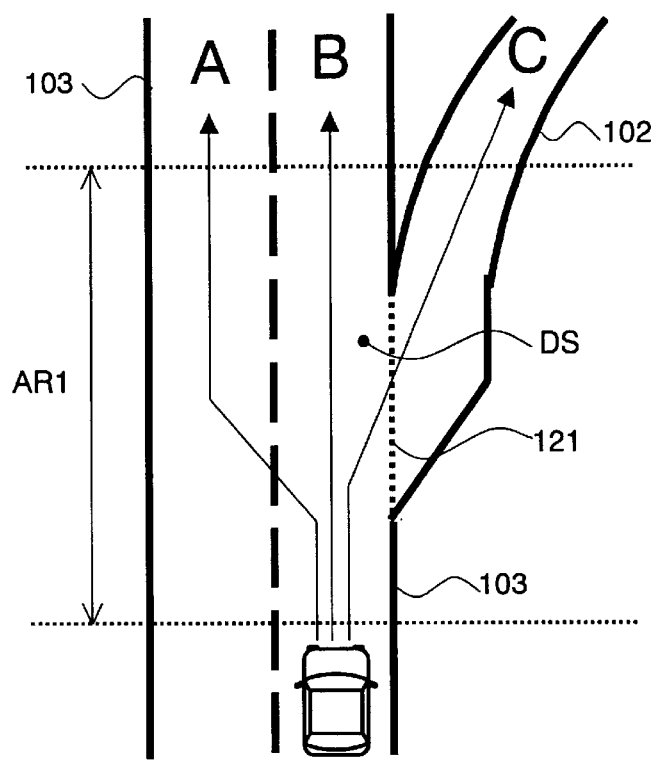
FIGS. 19 and 20 show an example of a third type road having a specific fork, in which six traveling courses between which the driver can choose are indicated by arrows.
Figure 20:
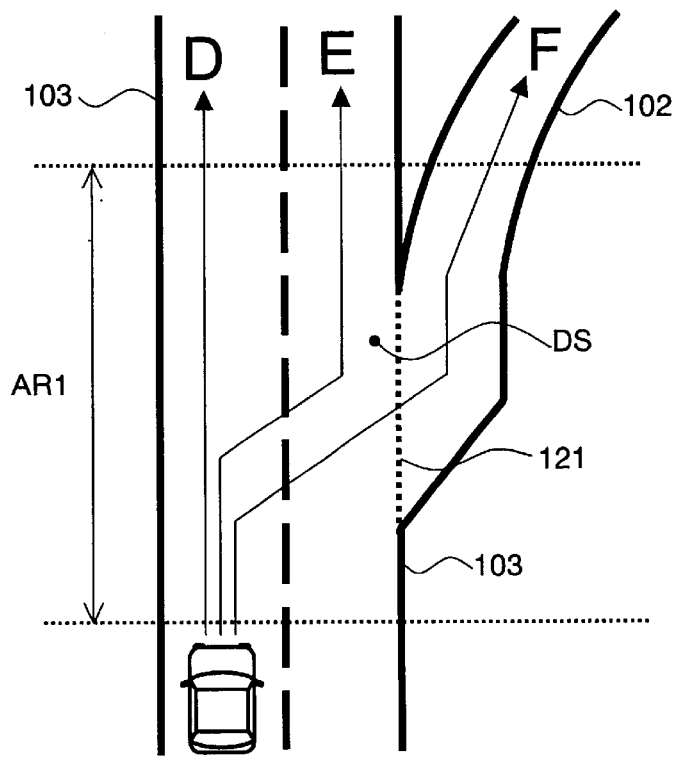

Next, a third example of the road determination process will be described with reference to FIGS. 19 and 20. FIGS. 19 and 20 show an example of a third type road having a specific fork.

In the example shown in FIGS. 19 and 20, a two-lane main way 103 has a fork DS (specific fork) at which a single-lane branch way 102 branches off from the main way 103. In these drawings, the reference numeral 121 denotes a dotted-line lane marker that defines a boundary between the main way 103 and an entrance lane to the branch way 102. The reference numeral AR1 denotes a specific area that is set with respect to the fork DS.

With regard to the fork DS having the above feature, the driver of the vehicle traveling on the main way 103 can choose any one of the six traveling courses A–F indicated by the arrows in FIGS. 19 and 20.

When the vehicle passes the fork DS, first the navigation apparatus carries out the first determination process to determine the traveling road on which the vehicle is going to travel after passing the fork DS or on which the vehicle is traveling after passing the fork DS. This first determination process is made based on (i) a detection result(s) obtained when the vehicle is within the specific area AR1 and (ii) a set of predetermined conditions related to the fork DS. Specifically, when the vehicle is within the specific area AR1, the navigation apparatus determines the traveling road by judging which one of the following conditions (a)–(c) is satisfied. (The following conditions used in the road determining process are determined in association with the features of the fork DS, and they are described with reference to Results 1–6 in FIG. 11.)

Conditions Used in the First Determination Process

Condition (a): Result 5 occurs, when the vehicle is within the specific area AR1.
Condition (b): Result 6 occurs twice after Result 4 has occurred, when the vehicle is within the specific area AR1.
Condition (c): Result 6 occurs after Result 3 has occurred, when the vehicle is within the specific area AR1.

In the case where the navigation apparatus has judged through the first determination process that none of the above-mentioned Conditions (a)–(c) is satisfied (i.e., in the case where the navigation apparatus has not successfully determined the traveling road when the vehicle is within the specific area AR1), the navigation apparatus carries out the second determination process after leaving the specific area AR1 to try to determine the traveling road again. This second determination process is made based on (i) the detection result(s) obtained when the vehicle was within the specific area AR1 and (ii) another set of predetermined conditions related to the fork DS. Specifically, after leaving the specific area AR1, the navigation apparatus determines the traveling road by judging which one of the following conditions (d) and (e) is satisfied.

Conditions Used in the Second Determination Process

Condition (d): Neither Result 5 nor 6 occurred, when the vehicle was within the specific area AR1.
Condition (e): Result 6 occurred once after Result 4 occurred, when the vehicle was within the specific area AR1.

For example, in the case where the vehicle takes Course A, the vehicle travels in the right-hand lane of the main way 103 and then changes lanes to get into an adjacent lane on the left side. In this case, through the first determination process the navigation apparatus judges that the above-mentioned condition (a) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course F, the vehicle travels in the left-hand lane of the main way 103 and then changes lanes to get into the entrance lane to the branch way 102. In this case, through the first determination process the navigation apparatus judges that the above-mentioned condition (b) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course C, the vehicle travels in the right-hand lane of the main way 103 and then changes lanes to get into the entrance lane to the branch way 102. In this case, through the first determination process the navigation apparatus judges that the above-mentioned condition (c) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course B, the vehicle travels straight in the right-hand lane of the main way 103 without changing lanes. In this case, through the second determination process, the navigation apparatus judges that the above-mentioned condition (d) has been satisfied. Based on this judgment, the navigation apparatus determines that the road on which the vehicle is traveling after passing the fork DS is the main way 103.

In the case where the vehicle takes Course D, the vehicle travels straight in the left-hand lane of the main way 103 without changing lanes. In this case, through the second determination process, the navigation apparatus judges that the above-mentioned condition (d) has been satisfied. Based on this judgment, the navigation apparatus determines that the road on which the vehicle is traveling after passing the fork DS is the main way 103.

In the case where the vehicle takes Course E, the vehicle travels in the left-hand lane of the main way 103 and then changes lanes to get into an adjacent lane on the right side. In this case, through the second determination process, the navigation apparatus judges that the above-mentioned condition (e) has been satisfied. Based on this judgment, the navigation apparatus determines that the road on which the vehicle is traveling after passing the fork DS is the main way 103.

Figure 21:
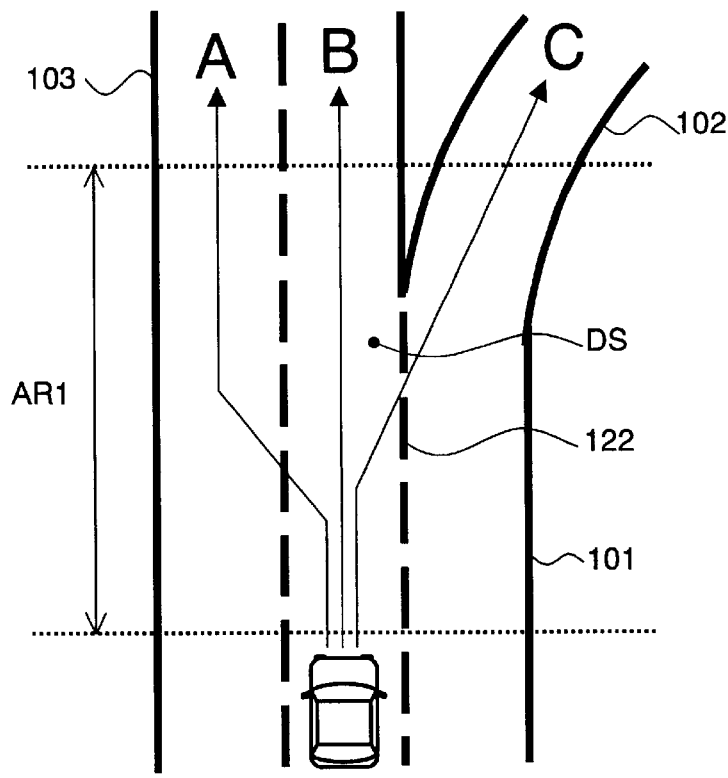
FIGS. 21–23 show an example of a fourth type road having a specific fork, in which nine traveling courses between which the driver can choose are indicated by arrows.
Figure 22:
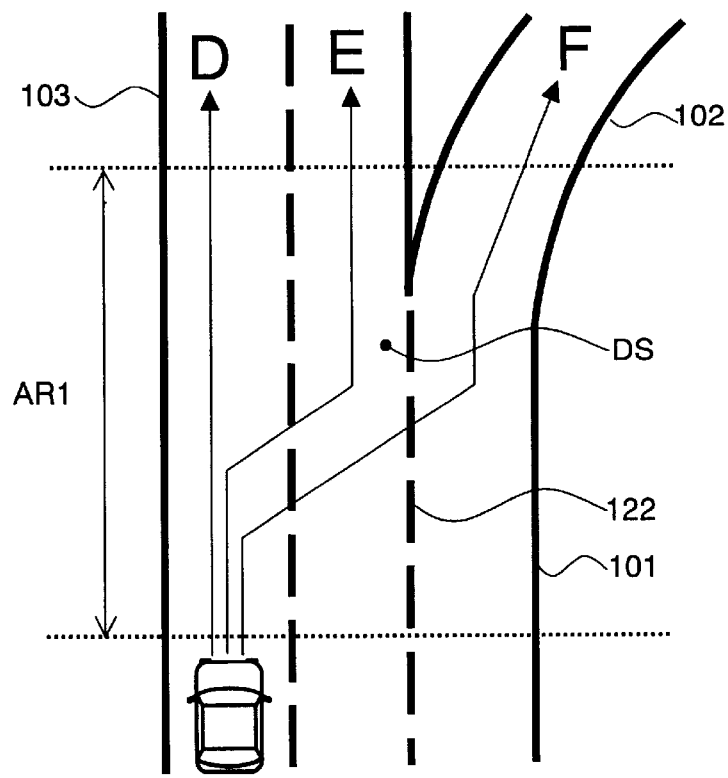
Figure 23:
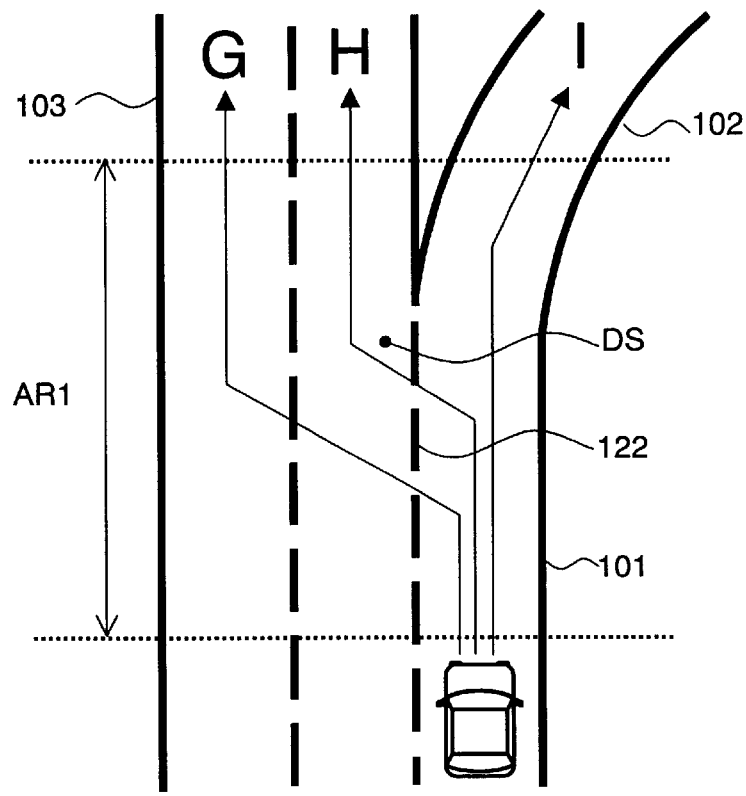

Next, a fourth example of the road determination process will be described with reference to FIGS. 21–23. FIGS. 21–23 show an example of a fourth type road having a specific fork.

In the example shown in FIGS. 21–23, a three-lane roadway 101 has a fork DS (specific fork) at which the roadway 101 divides into a two-lane main way 103 and a single-lane branch way 102. In these drawings, the reference numeral 122 denotes a broken-line lane marker that defines a boundary between entrance lanes to the main way 103 and an entrance lane to the branch way 102. The reference numeral AR1 denotes a specific area that is set with respect to the fork DS.

With regard to the fork DS having the above feature, the driver of the vehicle traveling on the roadway 101 can choose any one of the nine traveling courses A–I indicated by the arrows in FIGS. 21–23.

When the vehicle passes the fork DS, first the navigation apparatus carries out the first determination process to determine the traveling road on which the vehicle is going to travel after passing the fork DS or on which the vehicle is traveling after passing the fork DS. This first determination process is made based on (i) a detection result(s) obtained when the vehicle is within the specific area AR1 and (ii) a set of predetermined conditions related to the fork DS. Specifically, when the vehicle is within the specific area AR1, the navigation apparatus determines the traveling road by judging which one of the following conditions (a)–(e) is satisfied. (The following conditions used in the road determining process are determined in association with the features of the fork DS, and they are described with reference to Results 1–6 in FIG. 11.)

Conditions Used in the First Determination Process

Condition (a): Result 5 occurs after Result 2 has occurred, when the vehicle is within the specific area AR1.
Condition (b): Result 6 occurs after Result 2 has occurred, when the vehicle is within the specific area AR1.

Condition (c): Result 6 occurs twice after Result 4 has occurred, when the vehicle is within the specific area AR1.

Condition (d): Result 5 occurs twice after Result 3 has occurred, when the vehicle is within the specific area AR1.

Condition (e): Result 5 occurs once after Result 3 has occurred, when the vehicle is within the specific area AR1.

In the case where the navigation apparatus has judged through the first determination process that none of the above-mentioned Conditions (a)–(e) is satisfied (i.e., in the case where the navigation apparatus has not successfully determined the traveling road when the vehicle is within the specific area AR1), the navigation apparatus carries out the second determination process after leaving the specific area AR1 to try to determine the traveling road again. This second determination process is made based on (i) the detection results obtained when the vehicle was within the specific area AR1 and (ii) another set of predetermined conditions related to the fork DS. Specifically, after leaving the specific area AR1, the navigation apparatus determines the traveling road by judging which one of the following conditions (f)–(i) is satisfied.

Conditions Used in the Second Determination Process

Condition (f): Only Result 4 occurred without occurrence of any of Results 5 and 6, when the vehicle was within the specific area AR1.

Condition (g): Result 6 occurred once after Result 4 occurred, when the vehicle was within the specific area AR1.

Condition (h): Only Result 2 occurred without occurrence of any of Results 5 and 6, when the vehicle was within the specific area AR1.

Condition (i): Only Result 3 occurred without occurrence of any of Results 5 and 6, when the vehicle was within the specific area AR1.

For example, in the case where the vehicle takes Course A, the vehicle travels in a center lane of the roadway 101 and then changes lanes to get into an adjacent lane on the left side. In this case, through the first determination process the navigation apparatus judges that the above-mentioned condition (a) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course C, the vehicle travels in the center lane of the roadway 101 and then changes lanes to get into an adjacent lane on the right side. In this case, through the first determination process the navigation apparatus judges that the above-mentioned condition (b) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course F, the vehicle travels in the leftmost lane of the roadway 101 and then changes lanes to get into the rightmost lane. In this case, through the first determination process the navigation apparatus judges that the above-mentioned condition (c) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course G, the vehicle travels in the rightmost lane of the roadway 101 and then changes lanes to get into the leftmost lane. In this case, through the first determination process the navigation apparatus judges that the above-mentioned condition (d) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course H, the vehicle travels in the rightmost lane of the roadway 101 and then changes lanes to get into an adjacent lane on the left side. In this case, through the first determination process the navigation apparatus judges that the above-mentioned condition (e) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course D, the vehicle travels in the leftmost lane of the roadway 101 without changing lanes. In this case, through the second determination process, the navigation apparatus judges that the above-mentioned condition (f) has been satisfied. Based on this judgment, the navigation apparatus determines that the road on which the vehicle is traveling after passing the fork DS is the main way 103.

In the case where the vehicle takes Course E, the vehicle travels in the leftmost lane of the roadway 101 and then changes lanes to get into an adjacent lane on the right side. In this case, through the second determination process, the navigation apparatus judges that the above-mentioned condition (g) has been satisfied. Based on this judgment, the navigation apparatus determines that the road on which the vehicle is traveling after passing the fork DS is the main way 103.

In the case where the vehicle takes Course B, the vehicle travels in the center lane of the roadway 101 without changing lanes. In this case, through the second determination process, the navigation apparatus judges that the above-mentioned condition (h) has been satisfied. Based on this judgment, the navigation apparatus determines that the road on which the vehicle is traveling after passing the fork DS is the main way 103.

In the case where the vehicle takes Course I, the vehicle travels in the rightmost lane of the roadway 101 without changing lanes. In this case, through the second determination process, the navigation apparatus judges that the above-mentioned condition (i) has been satisfied. Based on this judgment, the navigation apparatus determines that the road on which the vehicle is traveling after passing the fork DS is the branch way 103.

Figure 24:
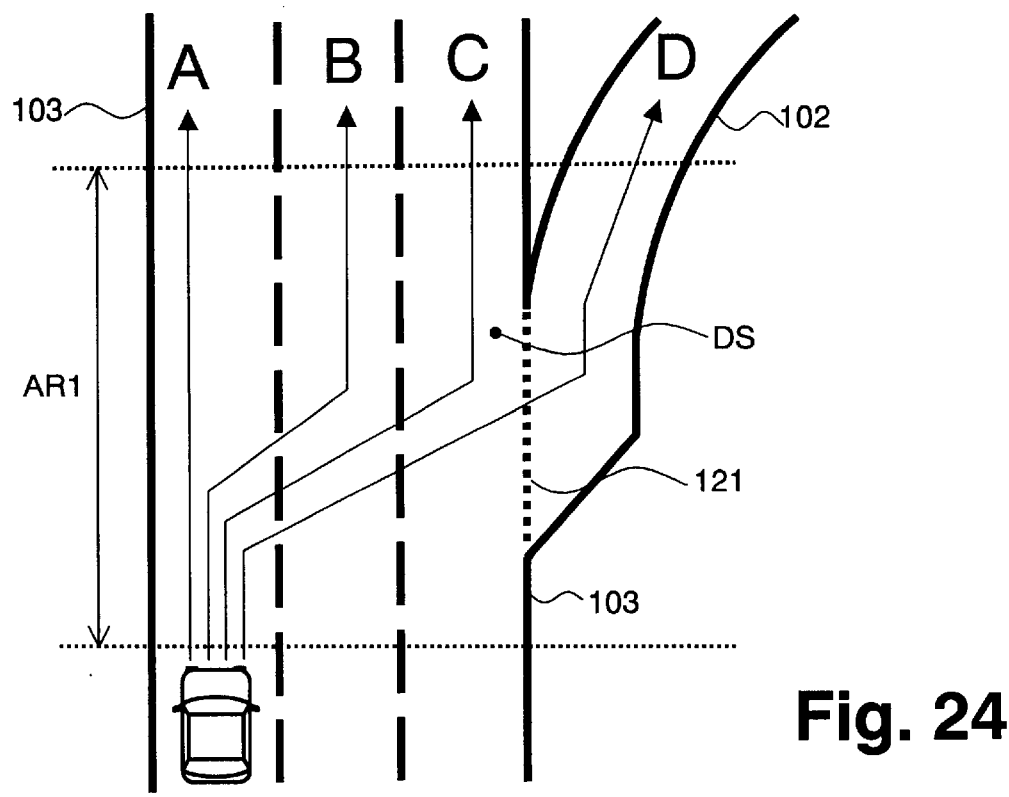
FIGS. 24–26 show an example of a fifth type road having a specific fork, in which twelve traveling courses between which the driver can choose are indicated by arrows.
Figure 25:
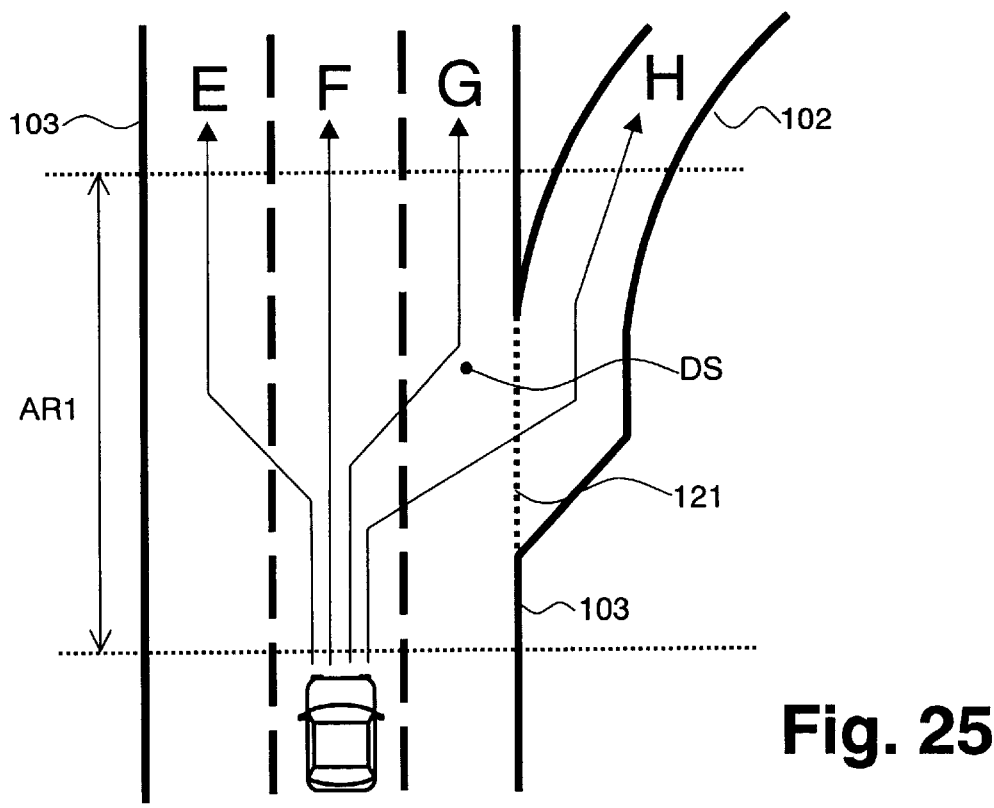
Figure 26:
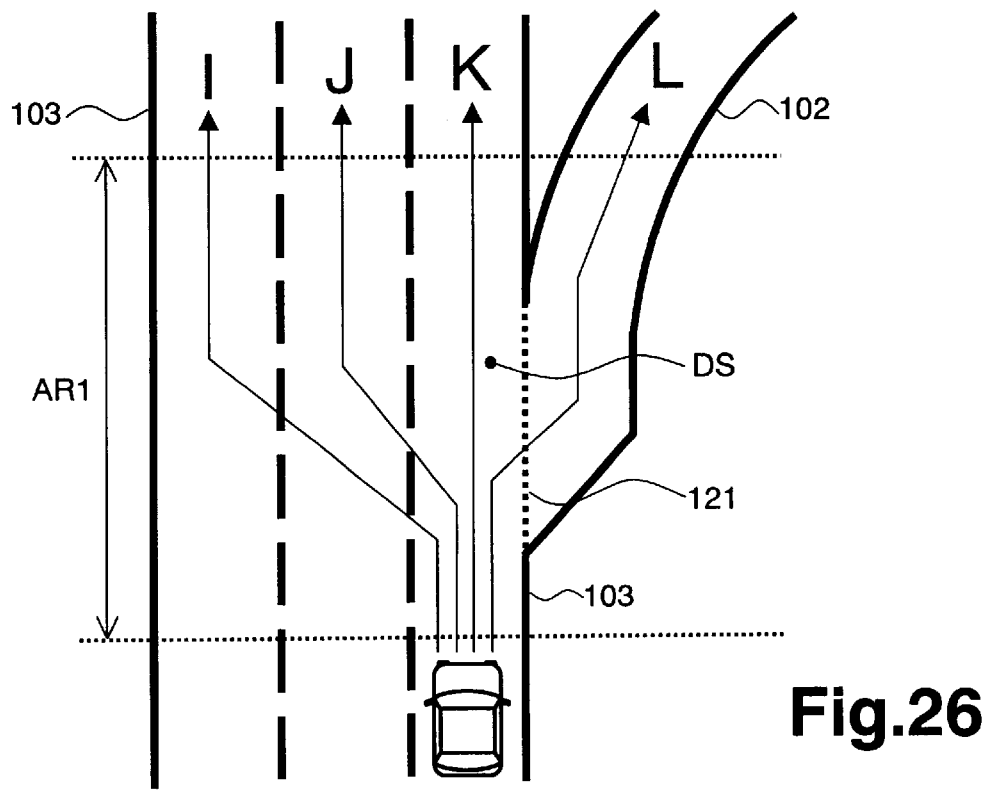
Figure 27:
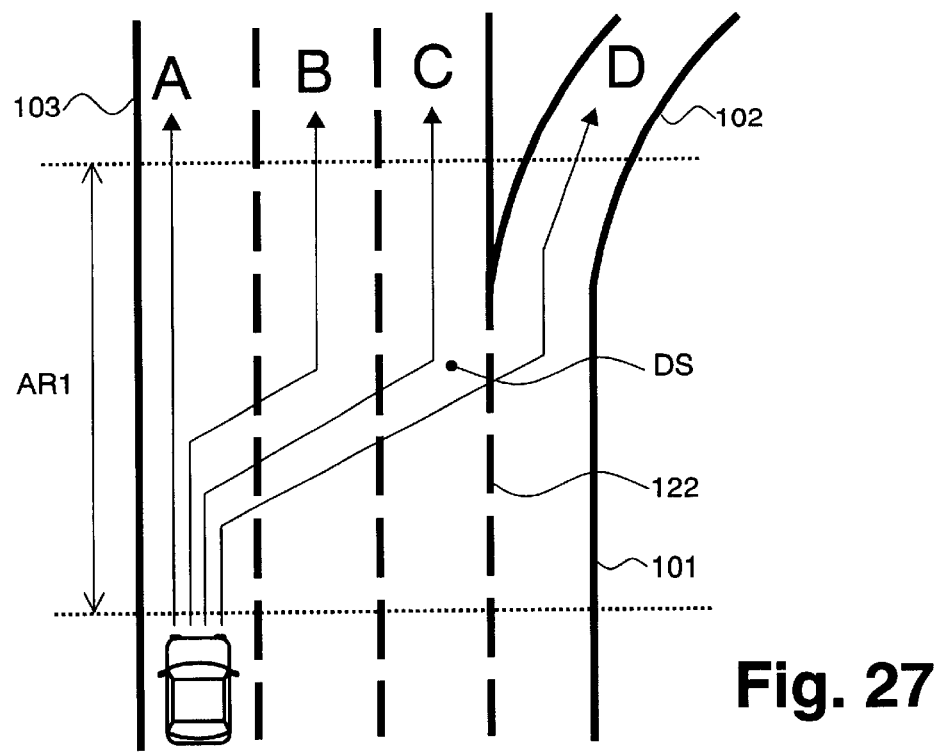
FIGS. 27–30 show an example of a sixth type road having a specific fork, in which sixteen traveling courses between which the driver can choose are indicated by arrows.
Figure 28:
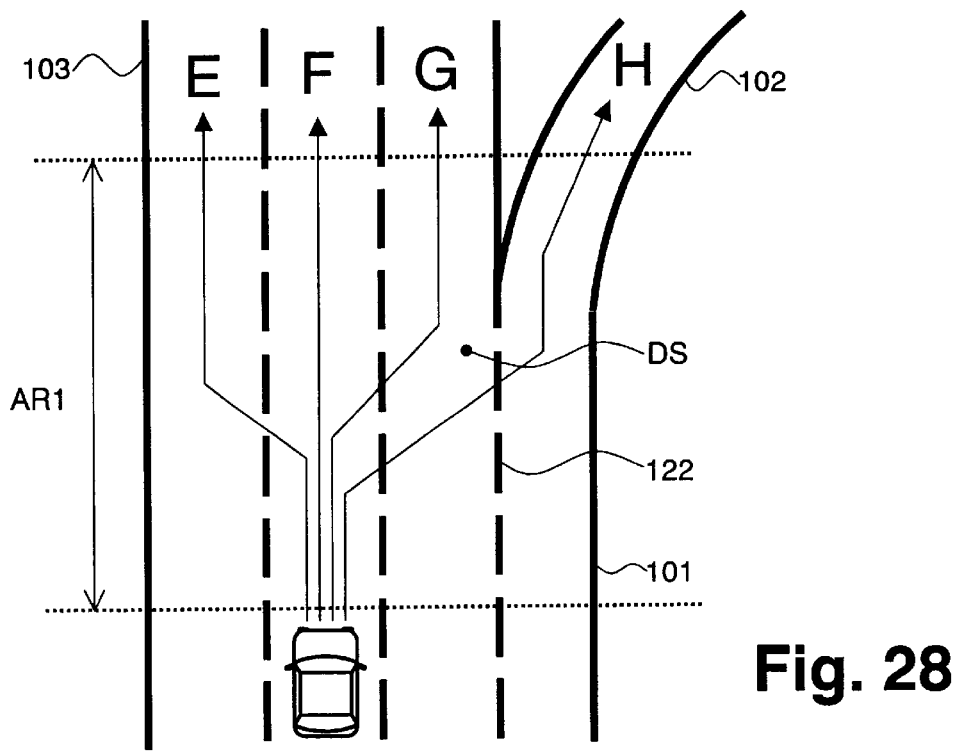
Figure 29:
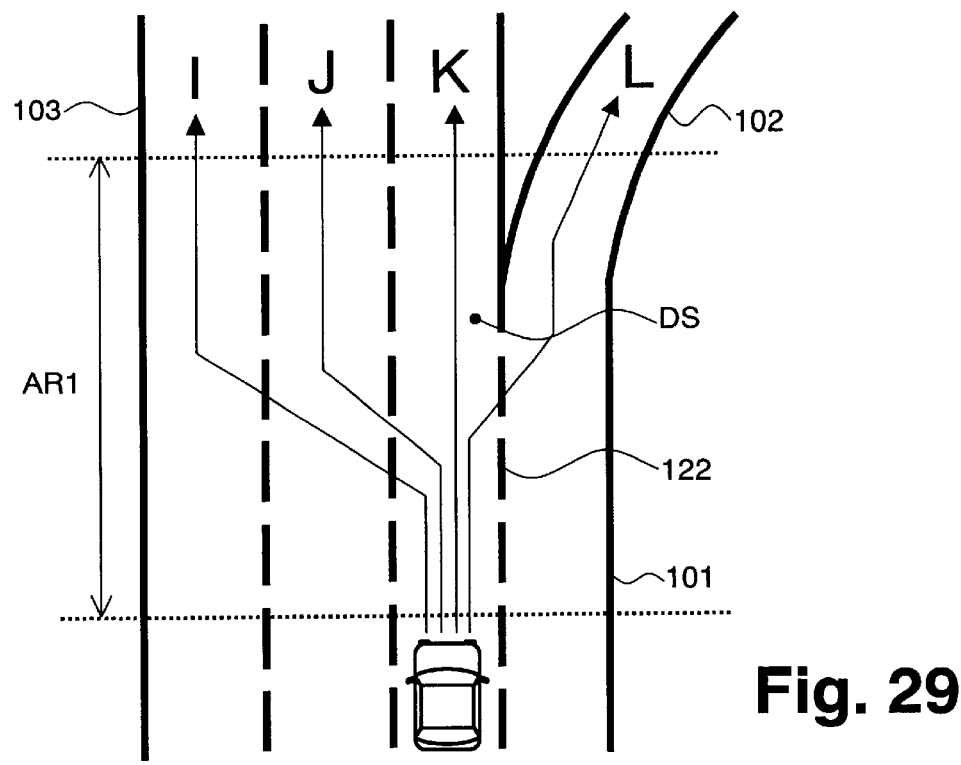
Figure 30:
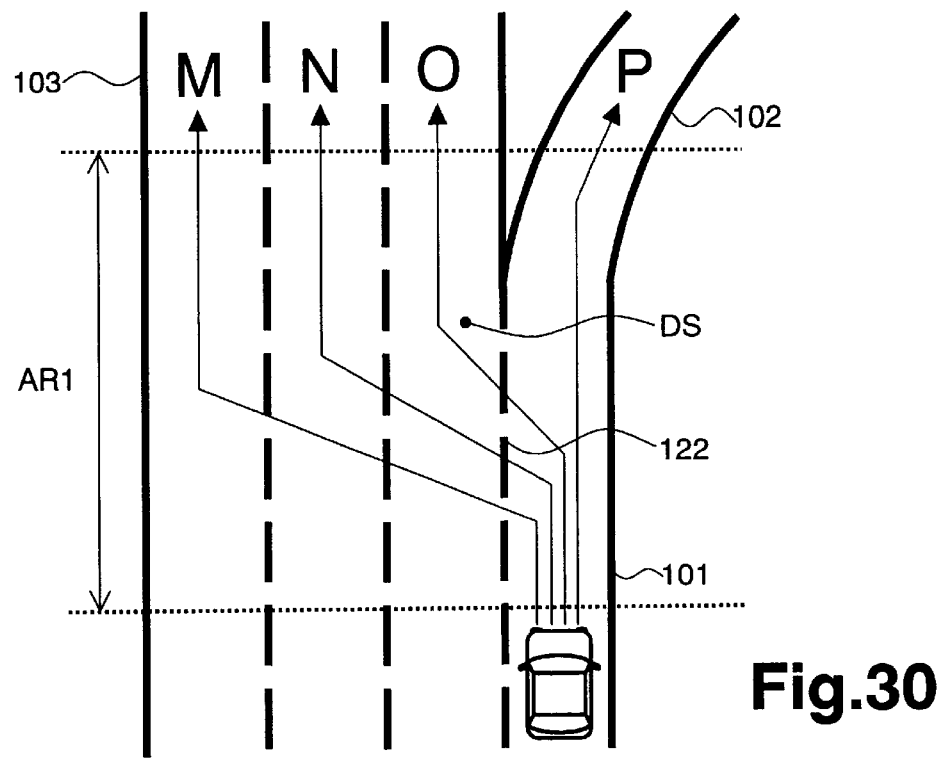
Figure 31:
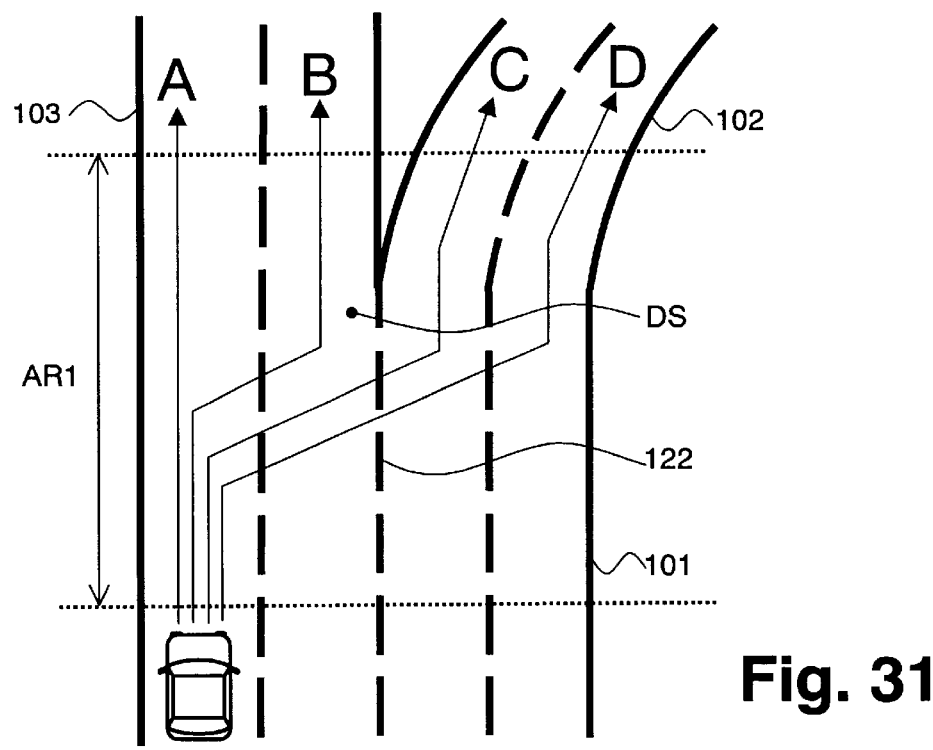
FIGS. 31–34 show an example of a seventh type road having a specific fork, in which sixteen traveling courses between which the driver can choose are indicated by arrows.
Figure 32:
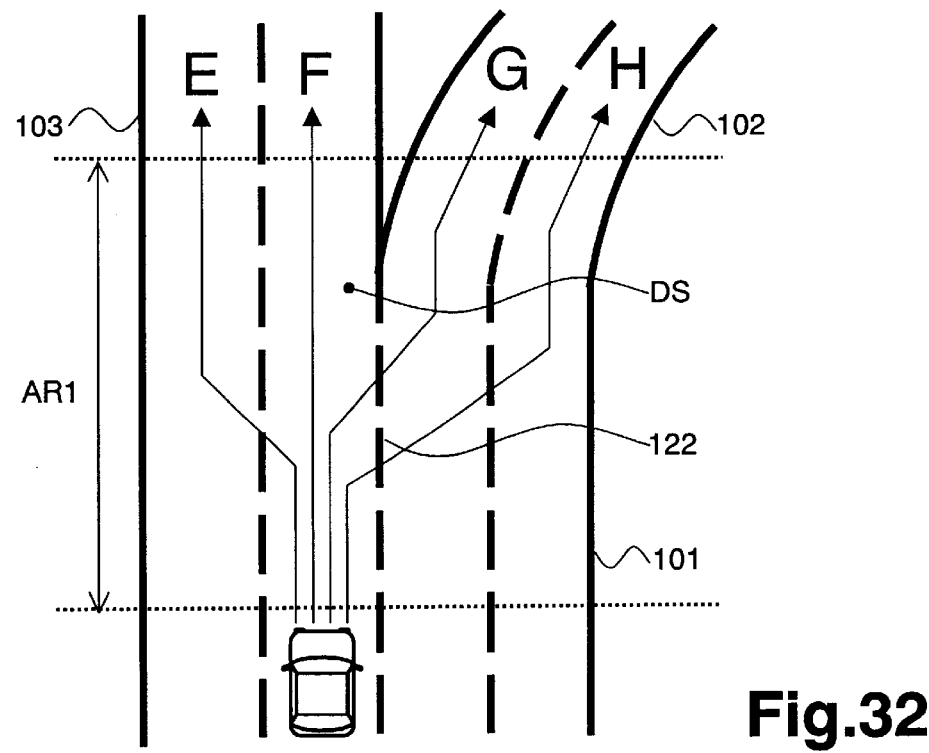
Figure 33:
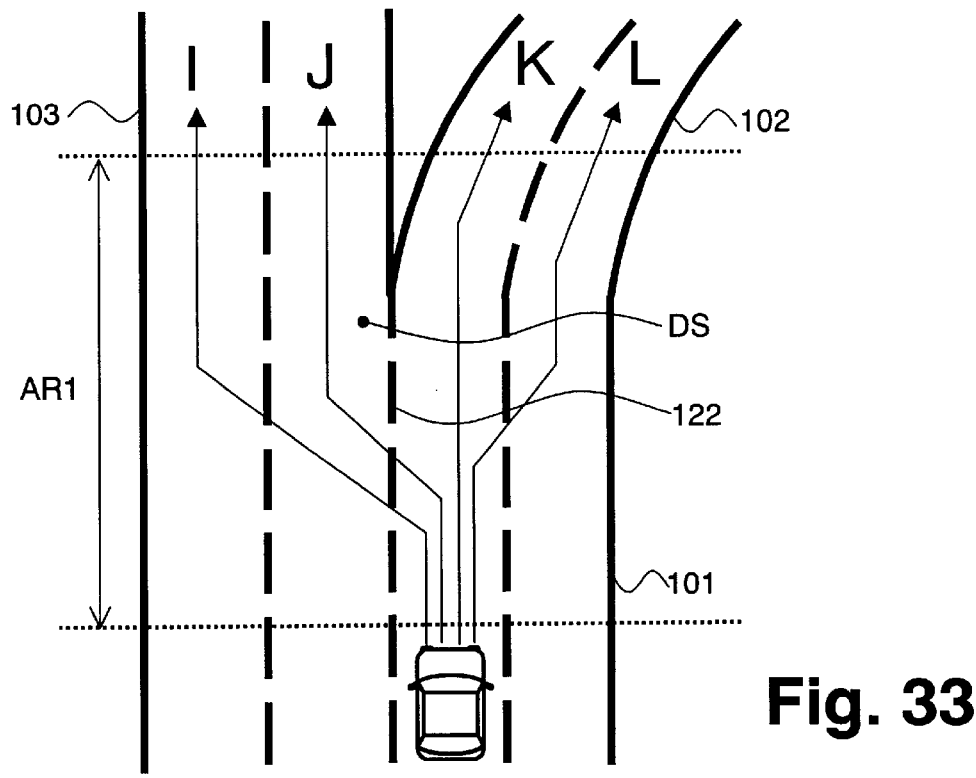
Figure 34:
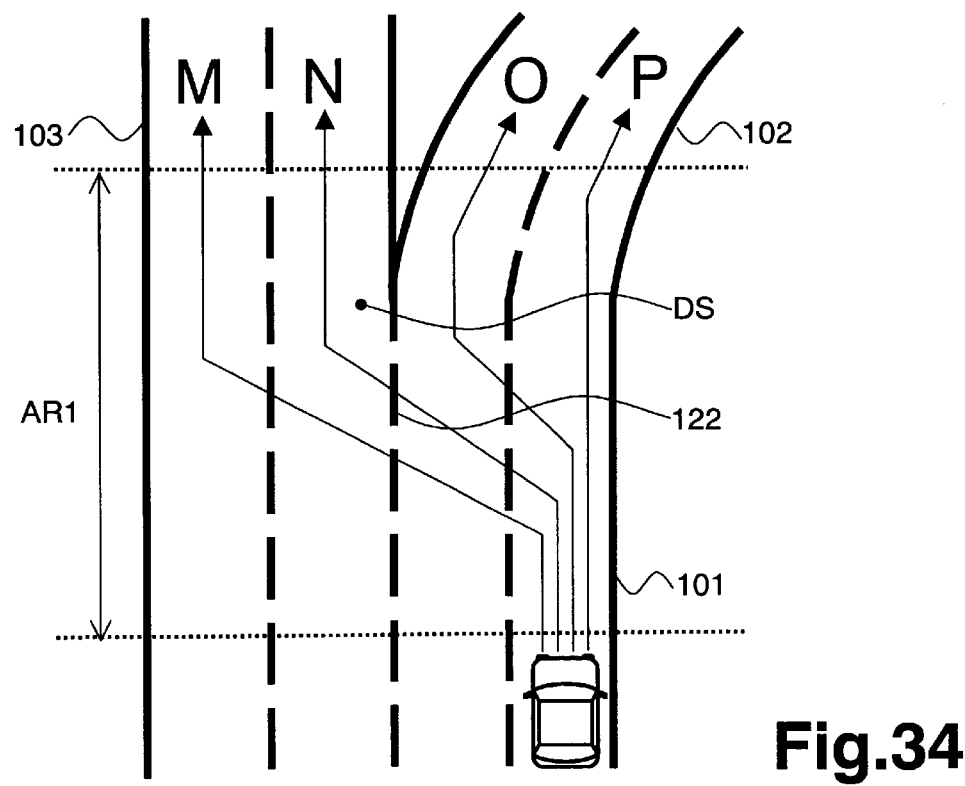

Next, a fifth example of the road determination process will be described with reference to FIGS. 24–26. FIGS. 24–26 show an example of a fifth type road having a specific fork.

In the example shown in FIGS. 24–26, a three-lane main way 103 has a fork DS (specific fork) at which a single-lane branch way 102 branches off from the main way 103. In these drawings, the reference numeral 121 denotes a dotted-line lane marker that defines a boundary between the main way 103 and an entrance lane to the branch way 102. The reference numeral AR1 denotes a specific area that is set with respect to the fork DS.

With regard to the fork DS having the above feature, the driver of the vehicle traveling on the main way 103 can choose any one of the twelve traveling courses A–L indicated by the arrows in FIGS. 24–26.

When the vehicle passes the fork DS, first the navigation apparatus carries out the first determination process to determine the traveling road on which the vehicle is going to travel after passing the fork DS or on which the vehicle is traveling after passing the fork DS. This first determination process is made based on (i) a detection result(s) obtained when the vehicle is within the specific area AR1 and (ii) a set of predetermined conditions related to the fork DS. Specifically, when the vehicle is within the specific area AR1, the navigation apparatus determines the traveling road by judging which one of the following conditions (a)–(d) is satisfied. (The following conditions used in the road determining process are determined in association with the features of the fork DS, and they are described with reference to Results 1–6 in FIG. 11.)

Conditions Used in the First Determination Process

Condition (a): Result 5 occurs once or twice, when the vehicle is within the specific area AR1.
Condition (b): Result 6 occurs third times after Result 4 has occurred, when the vehicle is within the specific area AR1.
Condition (c): Result 6 occurs once after Result 3 has occurred, when the vehicle is within the specific area AR1.
Condition (d): Result 6 occurs twice after Result 2 has occurred, when the vehicle is within the specific area AR1.

In the case where the navigation apparatus has judged through the first determination process that none of the above-mentioned Conditions (a)–(d) is satisfied (i.e., in the case where the navigation apparatus has not successfully determined the traveling road when the vehicle is within the specific area AR1), the navigation apparatus carries out the second determination process after leaving the specific area AR1 to try to determine the traveling road again. This second determination process is made based on (i) the detection results obtained when the vehicle was within the specific area AR1 and (ii) another set of predetermined conditions related to the fork DS. Specifically, after leaving the specific area AR1, the navigation apparatus determines the traveling road by judging which one of the following conditions (e)–(g) is satisfied.

Conditions Used in the Second Determination Process

Condition (e): Neither Result 5 nor 6 occurred, when the vehicle was within the specific area AR1.
Condition (f): Result 6 occurred once or twice after Result 4 occurred, when the vehicle was within the specific area AR1.
Condition (g): Result 6 occurred after Result 2 occurred, when the vehicle was within the specific area AR1.

For example, in the case where the vehicle takes Course E, the vehicle travels in the center lane of the main way 103 and then changes lanes to get into the leftmost lane. In this case, through the first determination process the navigation apparatus judges that the above-mentioned condition (a) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course I or J, the vehicle travels in the rightmost lane of the main way 103 and then changes lanes to get into the leftmost lane or center lane. In this case, through the first determination process the navigation apparatus judges that the above-mentioned condition (a) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course D, the vehicle travels in the leftmost lane of the main way 103 and then changes lanes to get into the branch way 102. In this case, through the first determination process the navigation apparatus judges that the above-mentioned condition (b) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course L, the vehicle travels in the rightmost lane of the main way 103 and then changes lanes to get into the branch way 102 on the right side. In this case, through the first determination process the navigation apparatus judges that the above-mentioned condition (c) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course H, the vehicle travels in the center lane of the main way 103 and then changes lanes to get into the branch way 102. In this case, through the first determination process the navigation apparatus judges that the above-mentioned condition (d) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course A, F or K, the vehicle travels straight on the main way 103 without changing lanes. In this case, through the second determination process, the navigation apparatus judges that the above-mentioned condition (e) has been satisfied. Based on this judgment, the navigation apparatus determines that the road on which the vehicle is traveling after passing the fork DS is the main way 103.

In the case where the vehicle takes Course B or C, the vehicle travels in the leftmost lane of the main way 103 and then changes lanes to get into the center lane or rightmost lane of the main way 103. In this case, through the second determination process, the navigation apparatus judges that the above-mentioned condition (f) has been satisfied. Based on this judgment, the navigation apparatus determines that the road on which the vehicle is traveling after passing the fork DS is the main way 103.

In the case where the vehicle takes Course G, the vehicle travels in the center lane of the main way 103 and then changes lanes to get into an adjacent lane on the right side. In this case, through the second determination process, the navigation apparatus judges that the above-mentioned condition (g) has been satisfied. Based on this judgment, the navigation apparatus determines that the road on which the vehicle is traveling after passing the fork DS is the main way 103.

Next, a sixth example of the road determination process will be described with reference to FIGS. 27–30. FIGS. 27–30 show an example of a sixth type road having a specific fork.

In the example shown in FIGS. 27–30, a four-lane roadway 101 has a fork DS (specific fork) at which the roadway 101 divides into a three-lane main way 103 and a single-lane branch way 102. In these drawings, the reference numeral 122 denotes a broken-line lane marker that defines a boundary between entrance lanes to the main way 103 and an entrance lane to the branch way 102. The reference numeral AR1 denotes a specific area that is set with respect to the fork DS.

With regard to the fork DS having the above feature, the driver of the vehicle traveling on the roadway 101 can choose any one of the sixteen traveling courses A–P indicated by the arrows in FIGS. 27–30.

When the vehicle passes the fork DS, the navigation apparatus carries out the road determination process only after leaving the specific area AR1 to determine the traveling road. The road determination process in this case is made based on (i) a detection result(s) obtained when the vehicle was within the specific area AR1 and (ii) a set of predetermined conditions related to the fork DS. Specifically, after leaving the specific area AR1, the navigation apparatus determines the traveling road by judging which one of the following conditions (a) and (b) is satisfied.

Conditions Used in the Road Determination Process

Condition (a): Result 1 occurred, when the vehicle was within the specific area AR1.
Condition (b): Result 1 did not occur, when the vehicle was within the specific area AR1.

For example, in the case where the vehicle takes Course D, H, L or P, the vehicle changes lanes t6 get into the entrance lane to the branch way 102. In this case, through the road determination process, the navigation apparatus judges that Result 1 occurred when the vehicle was within the specific area AR1. Based on this judgment, the navigation apparatus determines that the road on which the vehicle is traveling after passing the fork DS is the branch way 102.

On the other hand, in the case where the vehicle takes Course A, B, C, E, F, G, I, J, K, M, N or O, the vehicle enters the main way 103 from the roadway 101. In this case, through the road determination process, the navigation apparatus judges that Result 1 did not occur when the vehicle was within the specific area AR1. Based on this judgment, the navigation apparatus determines that the road on which the vehicle is traveling after passing the fork DS is the main way 103.

Next, a seventh example of the road determination process will be described with reference to FIGS. 31–34. FIGS. 31–34 show an example of a seventh type road having a specific fork.

In the example shown in FIGS. 31–34, a four-lane roadway 101 has a fork DS (specific fork) at which the roadway 101 divides into a two-lane main way 103 and a two-lane branch way 102. In these drawings, the reference numeral 122 denotes a broken-line lane marker that defines a boundary between entrance lanes to the main way 103 and entrance lanes to the branch way 102. The reference numeral AR1 denotes a specific area that is set with respect to the fork DS.

With regard to the fork DS having the above feature, the driver of the vehicle traveling on the roadway 101 can choose any one of the sixteen traveling courses A–P indicated by the arrows in FIGS. 31–34.

When the vehicle passes the fork DS, first the navigation apparatus carries out the first determination process to determine the traveling road on which the vehicle is going to travel after passing the fork DS or on which the vehicle is traveling after passing the fork DS. This first determination process is made based on (i) a detection result(s) obtained when the vehicle is within the specific area AR1 and (ii) a set of predetermined conditions related to the fork DS. Specifically, when the vehicle is within the specific area AR1, the navigation apparatus determines the traveling road by judging which one of the following conditions (a)–(d) is satisfied. (The following conditions used in the road determining process are determined in association with the features of the fork DS, and they are described with reference to Results 1–6 in FIG. 11.)

Conditions Used in the First Determination Process

Condition (a): Result 6 occurs two or three times, when the vehicle is within the specific area AR1.
Condition (b): Result 5 occurs two or three times, when the vehicle is within the specific area AR1.
Condition (c): Result 6 occurs after Result 2 has occurred, when the vehicle is within the specific area AR1.
Condition (d): Result 5 occurs after Result 2 has occurred, when the vehicle is within the specific area AR1.

In the case where the navigation apparatus has judged through the first determination process that none of the above-mentioned Conditions (a)–(d) is satisfied (i.e., in the case where the navigation apparatus has not successfully determined the traveling road when the vehicle is within the specific area AR1), the navigation apparatus carries out the second determination process after leaving the specific area AR1 to try to determine the traveling road again. This second determination process is made based on (i) the detection results obtained when the vehicle was within the specific area AR1 and (ii) another set of predetermined conditions related to the fork DS. Specifically, after leaving the specific area AR1, the navigation apparatus determines the traveling road by judging which one of the following conditions (e)–(j) is satisfied.

Conditions Used in the Second Determination Process

Condition (e): Only Result 4 occurred without occurrence of any of Results 5 and 6, when the vehicle was within the specific area AR1.
Condition (f): Result 6 occurred once after Result 4 occurred, when the vehicle was within the specific area AR1.
Condition (g): Result 5 occurred once after Result 3 occurred, when the vehicle was within the specific area AR1.
Condition (h): Only Result 3 occurred without occurrence of any of Results 5 and 6, when the vehicle was within the specific area AR1.
Condition (i): Without occurrence of any of Results 5 and 6, Result 3 occurred following Result 2, when the vehicle was within the specific area AR1.
Condition (j): Without occurrence of any of Results 5 and 6, Result 4 occurred following Result 2, when the vehicle was within the specific area AR1.

For example, in the case where the vehicle takes Course C, D or H, the vehicle travels in the leftmost lane or the second lane from the left side of the roadway 101 and then changes lanes to get into the entrance lane to the branch way 102. In this case, through the first determination process the navigation apparatus judges that the above-mentioned condition (a) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course I, M or N, the vehicle travels in the rightmost lane or the second lane from the right side of the roadway 101 and then changes lanes to get into the entrance lane to the main way 103. In this case, through the first determination process the navigation apparatus judges that the above-mentioned condition (b) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course G or L, the vehicle travels in the center-side lane (i.e., the second lane from the right or left side of the roadway 101) and then changes lanes to get into the entrance lane to the branch way 102. In this case, through the first determination process the navigation apparatus judges that the above-mentioned condition (c) has been satisfied, when the vehicle is within the specific area AR1. Based on this judgment, the navigation apparatus determines that the road on which the vehicle is going to travel after passing the fork DS (or on which the vehicle is traveling after passing the fork DS) is the branch way 102.

In the case where the vehicle takes Course E or J, the vehicle travels in the center-side lane (i.e., the second lane from the right or left side of the roadway 101) and then changes lanes to get into the main way 103. In this case, through the first determination process the navigation apparatus judges that the above-mentioned condition (d) has been satisfied, when the vehicle is within the specific area AR1. Based on this judgment, the navigation apparatus determines that the road on which the vehicle is going to travel after passing the fork DS (or on which the vehicle is traveling after passing the fork DS) is the main way 103.

In the case where the vehicle takes Course A, the vehicle travels straight in the leftmost lane of the roadway 101 without changing lanes. In this case, through the second determination process, the navigation apparatus judges that the above-mentioned condition (e) has been satisfied. Based on this judgment, the navigation apparatus determines that the road on which the vehicle is traveling after passing the fork DS is the main way 103.

In the case where the vehicle takes Course B, the vehicle travels in the leftmost lane of the roadway 101 and then changes lanes to get into an adjacent lane on the right side. In this case, through the second determination process, the navigation apparatus Judges that the above-mentioned condition (f) has been satisfied. Based on this judgment, the navigation apparatus determines that the road on which the vehicle is traveling after passing the fork DS is the main way 103.

In the case where the vehicle takes Course O, the vehicle travels in the rightmost lane of the roadway 101 and then changes lanes to get into an adjacent lane on the left side. In this case, through the second determination process, the navigation apparatus judges that the above-mentioned condition (g) has been satisfied. Based on this judgment, the navigation apparatus determines that the road on which the vehicle is traveling after passing the fork DS is the branch way 102.

In the case where the vehicle takes Course P, the vehicle travels straight in the rightmost lane of the roadway 101 without changing lanes. In this case, through the second determination process, the navigation apparatus judges that the above-mentioned condition (h) has been satisfied. Based on this judgment, the navigation apparatus determines that the road on which the vehicle is traveling after passing the fork DS is the branch way 102.

In the case where the vehicle takes Course F, the vehicle travels straight in the second lane from the left side of the roadway 101 without changing lanes. In this case, through the second determination process, the navigation apparatus judges that the above-mentioned condition (i) has been satisfied. Based on this judgment, the navigation apparatus determines that the road on which the vehicle is traveling after passing the fork DS is the main way 103.

In the case where the vehicle takes Course K, the vehicle travels straight in the second lane from the right side of the roadway 101 without changing lanes. In this case, through the second determination process, the navigation apparatus judges that the above-mentioned condition (j) has been satisfied. Based on this judgment, the navigation apparatus determines that the road on which the vehicle is traveling after passing the fork DS is the branch way 102.

Hereinbefore, the navigation apparatus, the method for map matching performed in the navigation apparatus, and the computer-readable medium storing a program for executing the method were described in detail.

According to the navigation apparatus of this invention, the map matching process is carried out through the following steps (a)–(h).

(a) Step of detecting a current position of the vehicle.
(b) Step of taking images of a road on which the vehicle is traveling.
(c) Step of detecting and watching lane markers on the road to obtain a detection result(s). The detection and watching are carried out by processing the images taken at the step (b).
(d) Step of judging whether or not a specific fork is located ahead of the current position of the vehicle based on the route/map data stored in the database 24.
(e) Step of retrieving the fork information of the specific fork from the route/map data. The retrieval is carried out in the case where it is judged at the step (d) that a specific fork is located ahead of the current position of the vehicle.
(f) Step of judging whether or not the vehicle has entered a specific area that is set with respect to the specific fork.
(g) Step of determining the traveling road on which the vehicle is traveling after passing the specific fork or on which the vehicle is going to travel after passing the specific fork. This determination is carried out based on (i) the obtained detection result(s) and (ii) predetermined conditions related to the specific fork.
(h) Step of correcting the vehicle's position displayed on the digital road map based on the determined road, if needed.

By determining the traveling road in this manner, it is possible for the navigation apparatus to know the traveling road just after passing the specific fork, based on the determination result at Step (g). Further, when the vehicle's actual location is displayed at a wrong position on the digital road map, the navigation apparatus can correct the position so that the road on which the vehicle is actually traveling immediately after passing the fork DS just corresponds to the road image along which the vehicle's mark is moving on the digital road map. This is advantageous in the following points. Namely, the driver can know its accurate location from the displayed information on the screen just after passing the specific fork. In addition, it is possible to prevent the corner control operation described above from being carried out at an inappropriate location.

Further, in the road determination process at the above-mentioned Step (g), the navigation apparatus does not depend on lane markers outside the specific area to determine the traveling road. This prevents the lane marker detection accuracy from being lowered due to, for example, shadows from other vehicles and the like.

In this invention, the determination in Step (g) is carried out in two stages. Specifically, in a first determination process (first stage), the navigation apparatus tries to determine the traveling road based on (i) a predetermined condition(s) related to the specific fork and (ii) a detection result(s) (i.e., any one or more of Results 1–6 shown in FIG. 11) obtained when the vehicle is within the specific area. This first determination process is carried out when the vehicle is within the specific area. Further, in the case where the navigation apparatus has not successfully determined the traveling road in the first determination process described above, after the vehicle has left the specific area AR1 the navigation apparatus executes a second determination process (second stage) to determine the traveling road. In this second determination process, the navigation apparatus tries to determine the traveling road based on (i) another predetermined condition(s) related to the specific fork and (ii) the detection result(s) obtained when the vehicle was within the specific area.

According to the above-mentioned road determination process which includes the first and second determination processes, it is possible for the navigation apparatus to properly determine the traveling road on which the vehicle is going to travel after passing the specific fork (or on which the vehicle is traveling after passing the specific fork).

Further, in the case where the traveling road has been successfully determined through the first determination process (first stage), it is possible for the navigation apparatus to know the traveling road just after passing a specific fork but before exiting the specific area. Therefore, if needed, the navigation apparatus can perform the map matching process properly just after passing the specific fork. This is advantageous in that the accurate positional information is provided to the driver via the display immediately after passing the specific fork.

Finally, it is to be understood that many changes and additions may be made to the embodiments described above without departing from the scope and spirit of the invention as defined in the appended Claims.

What is claimed is:

1. A navigation apparatus which is mounted on a vehicle, the navigation apparatus being capable of displaying a vehicle's location on a digital roadmap on a screen to provide route guidance to a user of the vehicle, the apparatus comprising:
   current position detecting means for detecting a current position of the vehicle;
   a database which stores route/map data including at least information of forks in roads, in which the fork information of each of the forks is stored in association with at least two predetermined conditions relating to features of the fork;
   imaging means for taking images of a road on which the vehicle is traveling;
   means for detecting and monitoring lane markers on the road to obtain detection results, the detection and monitoring being performed by processing the images taken by the imaging means;
   first judging means for judging whether or not a fork is located ahead of the current position of the vehicle, the judgment being made based on the route/map data;
   retrieval means for retrieving the fork information of the fork from the route/map data, the retrieval being made in a case where the first judging means judges that a fork is located ahead of the current position of the vehicle;
   second judging means for judging whether or not the vehicle has entered a specific area that is set with respect to the fork; and
   road determining means for determining the road on which the vehicle is traveling after passing the fork or on which the vehicle is going to travel after passing the fork, the determination being made based on the detection results and the predetermined conditions relating to the fork.

2. The navigation apparatus as claimed in claim 1, further comprising third judging means for judging whether or not the vehicle has left the specific area, wherein the road determining means includes:
   first means for making the determination when the vehicle is within the specific area; and
   second means for making the determination in a case where the third judging means judges that the vehicle has left the specific area.

3. The navigation apparatus as claimed in claim 2, wherein the predetermined conditions include first and second conditions, in which the first means makes the determination based on the first condition and the detection results obtained when the vehicle is within the specific area, and the second means makes the determination based on the second condition and the detection results obtained when the vehicle is within the specific area.

4. The navigation apparatus as claimed in claim 2, further comprising fourth judging means for judging whether or not the first means has successfully determined the road, wherein the second means makes the determination in a case where the fourth judging means judges that the first means has not successfully determined the road.

5. The navigation apparatus as claimed in claim 1, wherein the detection and monitoring means detects the type of each of the lane makers while monitoring lane change performed by the vehicle.

6. The navigation apparatus as claimed in claim 1, further comprising correcting means for correcting the vehicle's position displayed on the digital road map based on the determined road to match the vehicle's location on the road to its position on the digital road map.

7. A method for map matching performed in a navigation apparatus mounted on a vehicle, the navigation apparatus being capable of displaying a vehicle's location on a digital road map on a screen and matching the vehicle's location on a road to its position on the digital road map, the method comprising the steps of:
   (a) detecting a current position of the vehicle;
   (b) taking images of a road on which the vehicle is traveling;
   (c) detecting and watching lane markers on the road to obtain detection results, the detection and watching being performed by processing the images taken at the step (b);
   (d) judging whether or not a fork is located ahead of the current position of the vehicle based on route/map data stored in a database of the navigation apparatus, the route/map data including at least information of forks in roads, in which the fork information of each of the forks is stored in association which at least two predetermined conditions relating to features of the fork;

(e) retrieving the fork information of the fork from the route/map data in the database, the retrieval being made in a case where it is judged at the step (d) that a fork is located ahead of the current position of the vehicle;

(f) judging whether or not the vehicle has entered a specific area that is set with respect to the fork;

(g) determining the road on which the vehicle is traveling after passing the fork or on which the vehicle is going to travel after passing the fork, the determination being made based on the detection results and the predetermined conditions relating to the fork; and (h) correcting the vehicle's position displayed on the digital road map based on the determined road to match the vehicle's location on the road to its position on the digital road map.

8. A computer-readable medium which stores a program for executing a method for map matching performed in a navigation apparatus mounted on a vehicle, the navigation apparatus being capable of displaying a vehicle's location on a digital road map on a screen and matching the vehicle's location on a road to its position on the digital road map, the method comprising the steps of:

(a) detecting a current position of the vehicle;

(b) taking images of a road on which the vehicle is traveling;

(c) detecting and watching lane markers on the road to obtain detection results, the detection and watching being performed by processing the images taken at the step (b);

(d) judging whether or not a fork is located ahead of the current position of the vehicle based on route/map data stored in a database of the navigation apparatus, the route/map data including at least information of forks in roads, in which the fork information of each of the forks is stored in association with at least two predetermined conditions relating to features of the fork;

(e) retrieving the fork information of the fork from the route/map data in the database, the retrieval being made in a case where it is judged at the step (d) that a fork is located ahead of the current position of the vehicle;

(f) judging whether or not the vehicle has entered a specific area that is set with respect to the fork;

(g) determining the road on which the vehicle is traveling after passing the fork or on which the vehicle is going to travel after passing the fork, the determination being made based on the detection results and the predetermined conditions relating to the fork; and (h) correcting the vehicle's position displayed on the digital road map based on the determined road to match the vehicle's location on the road to its position on the digital road map.

* * * * *